(12) United States Patent
Aguilar et al.

(10) Patent No.: US 11,578,886 B2
(45) Date of Patent: *Feb. 14, 2023

(54) TEMPERATURE COMPENSATION FOR LOW-VOLTAGE THERMOSTATS

(71) Applicant: Ademco Inc., Golden Valley, MN (US)

(72) Inventors: Rafael Aguilar, Chihauhua (MX); Sergio Adrian Martinez, Chihuahua (MX); Ever Hernandez, Chihuahua (MX); Mohammad A. Aljabari, Brooklyn Park, MN (US)

(73) Assignee: Ademco Inc., Golden Valley, MN (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/935,107

(22) Filed: Jul. 21, 2020

(65) Prior Publication Data

US 2022/0026086 A1    Jan. 27, 2022

(51) Int. Cl.
*F24F 11/30* (2018.01)
*F24F 11/65* (2018.01)
(Continued)

(52) U.S. Cl.
CPC ............. *F24F 11/30* (2018.01); *F24F 11/65* (2018.01); *F24F 11/80* (2018.01); *F24F 11/88* (2018.01);
(Continued)

(58) Field of Classification Search
CPC .. F24F 11/30; F24F 11/65; F24F 11/80; F24F 11/88
See application file for complete search history.

(56) References Cited

U.S. PATENT DOCUMENTS 4,741,476 A * 5/1988 Russo ................ G05D 23/1927
165/265
5,199,637 A    4/1993 Adams
(Continued)

FOREIGN PATENT DOCUMENTS

| CN | 103868610 B | 2/2017 |
|---|---|---|
| EP | 3324164 A1 | 5/2018 |
| JP | 2017053677 A | 3/2017 |

OTHER PUBLICATIONS

Skymind, "A.I. Wiki," accessed from https://skymind.ai/wiki/neural-network#concrete retrieved on Oct. 30, 2019, 12 pp.
(Continued)

*Primary Examiner* — Mark A Connolly
(74) *Attorney, Agent, or Firm* — Greenberg Traurg, LLP; Ryan D. Sharp; David J. Dykeman

(57) ABSTRACT

A thermostat device may use one or two temperature sensors inside the housing of the thermostat device to perform temperature compensation to determine the ambient temperature outside the housing of the thermostat device. Processing circuitry of the thermostat device may determine a current operating mode of the thermostat device out of a plurality of operating modes. The processing circuitry may also use machine learning to estimate the current and voltage of the thermostat device based on temperature differences between the two temperature sensors. The processing circuitry may determine, based at least in part on the estimated current and voltage of the thermostat device and the current operating mode of the thermostat device, an ambient temperature outside the housing of the thermostat device.

18 Claims, 23 Drawing Sheets

(51) Int. Cl.
  *F24F 11/80* (2018.01)
  *F24F 11/88* (2018.01)
  *F24F 13/20* (2006.01)
  *F24F 140/50* (2018.01)
  *F24F 110/12* (2018.01)

(52) U.S. Cl.
  CPC ........... *F24F 13/20* (2013.01); *F24F 2110/12* (2018.01); *F24F 2140/50* (2018.01)

(56) References Cited

U.S. PATENT DOCUMENTS

| | | | |
|---|---|---|---|
| 8,280,673 | B2 | 10/2012 | Aljabari |
| 9,335,769 | B2 | 5/2016 | Aljabari et al. |
| 9,784,624 | B2 | 10/2017 | Niederberger et al. |
| 9,797,619 | B2 | 10/2017 | Aljabari et al. |
| 10,209,688 | B2 | 2/2019 | Stefanski et al. |
| 10,222,271 | B2 | 3/2019 | Aljabari et al. |
| 2005/0183430 | A1 | 8/2005 | McMillan et al. |
| 2011/0289951 | A1 | 12/2011 | Furlong et al. |
| 2013/0099008 | A1 | 4/2013 | Aljabari et al. |
| 2014/0277770 | A1* | 9/2014 | Aljabari ................. H05K 13/00 700/278 |
| 2014/0328368 | A1 | 11/2014 | Niederberger et al. |
| 2016/0231755 | A1 | 8/2016 | Ajax et al. |
| 2016/0349823 | A1* | 12/2016 | Killo .................... G09G 3/2003 |
| 2017/0059190 | A1* | 3/2017 | Stefanski ............. G05D 23/193 |
| 2019/0109443 | A1* | 4/2019 | Bhate ....................... F24F 11/89 |
| 2019/0178511 | A1* | 6/2019 | Zimmerman ............ F24F 11/30 |
| 2019/0178521 | A1 | 6/2019 | Zimmerman et al. |
| 2020/0036304 | A1 | 1/2020 | Ponce et al. |
| 2020/0132554 | A1 | 4/2020 | Aguilar et al. |

OTHER PUBLICATIONS

U.S. Appl. No. 16/669,330, filed Oct. 30, 2019, naming inventors Aguilar et al.

* cited by examiner

TEMPERATURE COMPENSATION FOR LOW-VOLTAGE THERMOSTATS

TECHNICAL FIELD

The disclosure relates to a thermostat device.

BACKGROUND

A thermostat device can control a variety of devices such as a furnace, a heat pump including a geothermal heat pump, a boiler, air conditioning unit, forced air circulation, and other similar equipment to control the internal climate conditions of a building. In some examples, a thermostat device may be able to determine the ambient temperature of the environment in which the thermostat device is physically located, such as the ambient temperature of the room where the thermostat device is situated.

SUMMARY

In general, this disclosure relates to a thermostat device, such as for use with a heating, ventilation, and air conditioning (HVAC) system, that may determine the ambient temperature of the environment in which the thermostat device is located based at least in part on the temperature measurements of one or more temperature sensors located inside the housing of the thermostat device.

To determine the ambient temperature of the environment in which a thermostat device is physically located, the thermostat device may include one or more temperature sensors that are configured to measure temperature. However, these temperature sensors of a thermostat device may be fully enclosed within the housing of the thermostat device along with electronic components of the thermostat device, such as processing circuitry, that may produce heat. Thus, the temperature measured by temperature sensors of a thermostat device may be different from the actual ambient temperature outside of the thermostat device in the environment in which the thermostat device is physically located.

As such, a thermostat device may perform temperature compensation on the temperature measurements of the one or more temperature sensors located inside the housing of the temperature device in order to determine the ambient temperature outside of the thermostat device. In some examples, a thermostat device may include four, five, or even more temperature sensors that are located in different areas within the housing of the thermostat device, and the thermostat device may perform temperature compensation based on the temperature measurements of such temperature sensors.

However, using a large number of temperature sensors (e.g., more than two temperature sensors) in order to measure temperature within the housing of a thermostat device in order to perform temperature compensation and to determine the ambient temperature outside of the thermostat device may lead to high power usage by the thermostat device. Thus, such techniques may not be suitable for low-voltage thermostat devices.

As such, aspects of the present disclosure describe techniques for performing temperature compensation to determine the ambient temperature outside of a thermostat device based on the temperature measurements of no more than two temperature sensors within the housing of the thermostat device. The techniques described herein thereby reduce the number of temperature sensors included in a thermostat device may while enabling the thermostat device to be able to perform accurate temperature compensation to determine the ambient temperature outside of the thermostat device.

Thus, aspects of the present disclosure provide a technical advantage of reducing the amount of power consumed by thermostat devices compared with alternative techniques that uses more than two temperature sensors to perform temperature compensation. The techniques described in the present disclosure thereby enables low-voltage thermostat devices to accurately determine the ambient temperature of the immediate environs of the thermostat devices.

In one example, the disclosure is directed to a thermostat device. The thermostat device includes a housing. The thermostat device further includes an electronic circuit board in the housing. The thermostat device further includes a first temperature sensor disposed on the electronic circuit board in the housing and configured to sense a first temperature. The thermostat device further includes processing circuitry in the housing configured to: determine a current operating mode of the thermostat device out of a plurality of operating modes; and determine an ambient temperature outside the housing of the thermostat device based at least in part on the first temperature and the current operating mode of the thermostat device.

In one example, the disclosure is directed to a method for performing temperature compensation. The method includes sensing, by a first temperature sensor disposed on an electronic circuit board in a housing of a thermostat device, a first temperature. The method further includes determining, by the processing circuitry, a current operating mode of the thermostat device out of a plurality of operating modes. The method further includes determining, by the processing circuitry, an ambient temperature outside the housing of the thermostat device based at least in part on the first temperature and the current operating mode of the thermostat device.

In one example, the disclosure is directed to an apparatus. The apparatus may include means for sensing a first temperature. The apparatus further includes means for determining a current operating mode of the apparatus out of a plurality of operating modes. The apparatus further includes means for determining an ambient temperature outside a housing of the apparatus based at least in part on the first temperature and the current operating mode of the apparatus.

The details of one or more examples of the disclosure are set forth in the accompanying drawings and the description below. Other features, objects, and advantages of the disclosure will be apparent from the description and drawings, and from the claims.

DETAILED DESCRIPTION

In general, this disclosure relates to techniques for a thermostat device to determine the ambient temperature in ways that reduces the number of temperature sensors used by the thermostat device. More specifically, the techniques disclosed herein enable a thermostat device to perform temperature compensation to determine the ambient temperature of the room or immediate surroundings of where the thermostat device is situated using no more than two temperature sensors.

Figure 1:
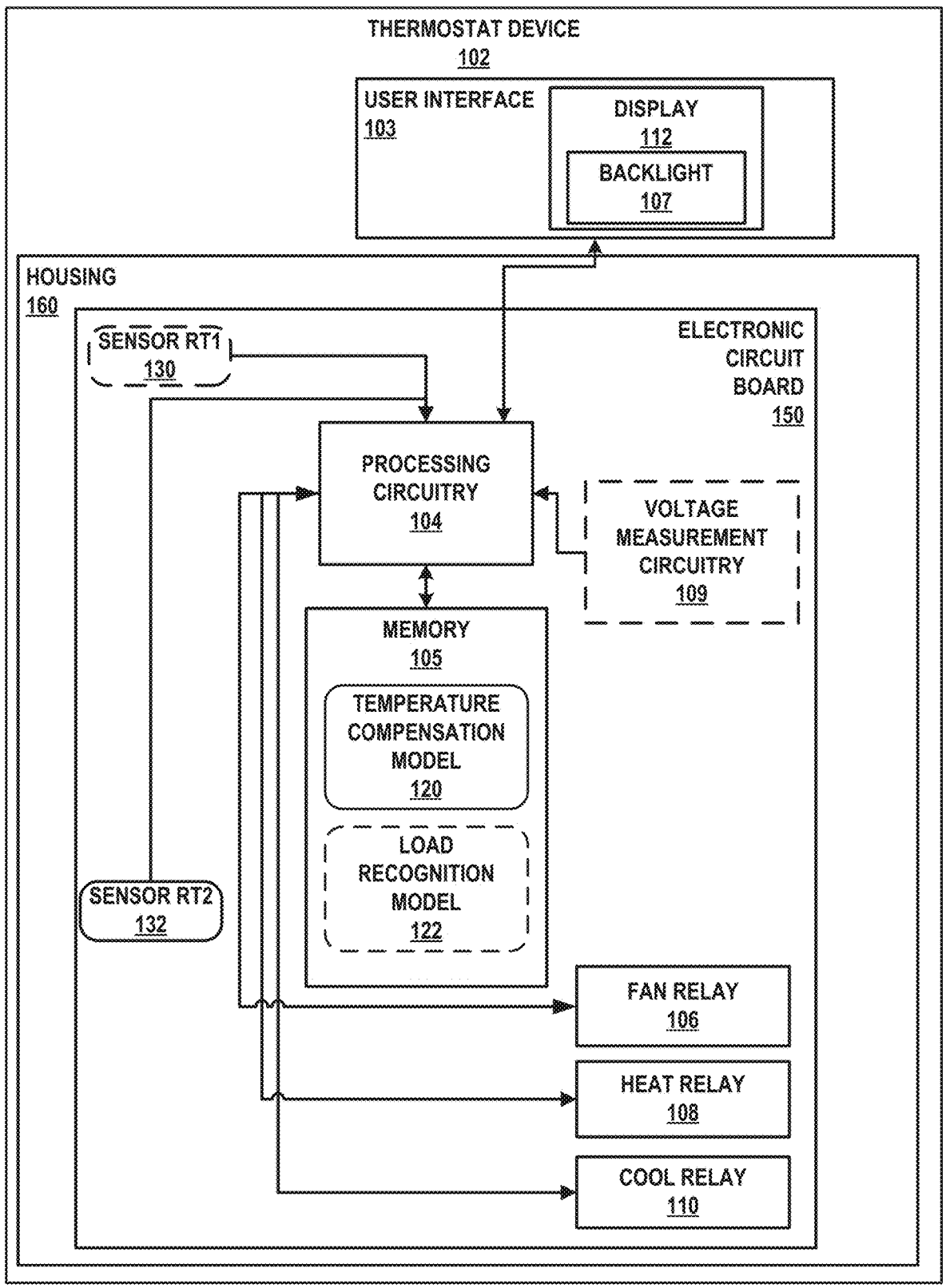
FIG. 1 is a block diagram illustrating a thermostat device for controlling a heating, ventilation, and air conditioning (HVAC) system according to one or more aspects of the present disclosure.

FIG. 1 is a block diagram illustrating a thermostat device for controlling a heating, ventilation, and air conditioning (HVAC) system according to one or more aspects of the present disclosure. As shown in FIG. 1, thermostat device 102 includes processing circuitry 104, which may receive signals from temperature sensor 130, temperature sensor 132, and user interface 103. Processing circuitry 104 may store and retrieve data from memory 105. Processing circuitry 104 may also send control signals to fan relay 106, heat relay 108, and cool relay 110 to control the operations of an HVAC system operably coupled to thermostat device 102. In some examples, processing circuitry 104 may also receive signals from pump relay 106, blower high relay 108 and blower low relay 110, or from electronic circuit board components coupled to pump relay 106, blower high relay 108 and blower low relay 110 that provide status information for pump relay 106, blower high relay 108 and blower low relay 110, e.g. relay open, relay closed, and so on.

In some examples the components of thermostat device 102 may be mounted to one or more electronic circuit boards, such as electronic circuit board 150. For example, temperature sensor 130, temperature sensor 132, processing circuitry 104, memory 105, fan relay 106, heat relay 108, cool relay 110, and voltage measurement circuitry 109 may all be mounted on electronic circuit board 150. Thermostat device 102 may be powered in via alternating current (A/C) power or via batteries. In some examples, thermostat device 102 is a low voltage thermostat that may operate between, for example, 18 Volts to 30 Volts, and the current running through fan relay 106, heat relay 108, cool relay 110 may range between 0.01 Amperes to 1.0 Amperes.

Some examples of processing circuitry 104 may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "computer," "processing circuitry," "processor" or "controller," as used herein, may refer to any one or more of the foregoing structures or any other structure operable to perform techniques described herein.

Examples of memory 105 may include RAM, ROM, EEPROM, other magnetic storage devices, flash memory, or any other medium that can be used to store desired program code in the form of instructions or data structures and that can be accessed by a computer. Memory 105 may store measured values over time, may include instructions that may be executed by one or more processors, and may act as temporary data storage. In some examples memory 105 may be integrated with processing circuitry 104, such as with an MCU or SoC. In other examples, memory 105 may be a separate component operatively coupled to processing circuitry 104.

User interface 103 may include one or more controls (not shown in FIG. 1) configured to receive input from a user, such as to select a desired temperature or operating mode for thermostat device 102. User interface 103 may also include display 112, which may indicate the set temperature, measured room temperature, operating mode and other items. Examples of display 112 include liquid crystal displays (LCDs) and the like. Display 112 may include backlight 107 that may be turned on to illuminate display 112 and may be turned off to cease illuminating display 112.

Fan relay 106, heat relay 108, and cool relay 110 may be relays or other hardware components for controlling the HVAC system operably coupled to thermostat device 102. For example, fan relay 106 may communicate with the HVAC system to control the operations of one or more fans in the HVAC system. Heat relay 108 may communicate with the HVAC system to control the heating provided by HVAC system. Cool relay 110 may similarly communicate with the HVAC system to control the cooling provided by HVAC system. Though described as "relay" in the example of FIG. 1, fan relay 106, heat relay 108, and cool relay 110 may be any type of switch that may receive control signals from processing circuitry 104 and control the current flowing to components of the HVAC system. In other examples, fan relay 106, heat relay 108, and cool relay 110 may be implemented as an electronic switch such as an insulated gate bipolar transistor (IGBT) or other power switch.

In the example of FIG. 1, temperature sensor 130 and temperature sensor 132 are the sensors included in thermostat device 102. Examples of temperature sensor 130 and temperature sensor 132 include thermistors, thermocouples, and the like. In other examples, other sensors may be included as part of thermostat device 102, such as humidity sensor, presence sensor, and other types of sensors. In the example of FIG. 1, temperature sensor 130 may be considered the "hot" sensor and be placed in an area of electronics circuit board 150 of thermostat device 102 that may be subject to higher temperatures when compared to the location of temperature sensor 132. For example, temperature sensor 130 may be placed near fan relay 106, heat relay 108, and cool relay 110, which may be subject to increased temperature as current flows through fan relay 106, heat relay 108, and cool relay 110. Temperature sensor 132 may be placed in a more isolated location on electronic circuit board 150 of thermostat device 102, or in a location with low voltage components that are less likely to increase in temperature.

In some example, components of thermostat device 102 may be fully enclosed (e.g., sealed) in housing 160 of thermostat device 102. For example, electronic circuit board 150, processing circuitry 104, memory 105, temperature sensor 130, temperature sensor 132, fan relay 106, heat relay 108, and cool relay 110 may all be enclosed within housing 160. Although housing 160 may not be airtight, housing 160 may be made of a solid material, such as plastic, rubber, and the like and may not include grilles or similar openings to the ambient room air. As such, heat generated by components within housing 160, such as processing circuitry 104, memory 105, fan relay 106, heat relay 108, and cool relay 110 may produce heat that may be trapped within housing 160. This may cause components such as electronic circuit board 150 within housing 160 to heat up and be hotter than the ambient room air outside of housing 160. Thus, the temperature measurements of temperature sensor 130, temperature sensor 132 may be higher than the ambient air temperature outside of housing 160.

As such, the temperature measurements of temperature sensor 130, temperature sensor 132 may be higher than the ambient air temperature outside of housing 160, thermostat device 102 may perform temperature compensation to adjust the temperatures sensed by temperature sensor 130 and/or temperature sensor 132 in order to determine the ambient temperature outside of housing 160. In particular, thermostat device 102 may perform temperature compensation on the temperature sensed by a single temperature sensor—temperature sensor 132, which is placed at a relatively cool location of electronics circuit board 150 compared with temperature sensor 130, in order to determine the ambient temperature outside of thermostat device 102 in the environment in which thermostat device 102 is physically located, such as the ambient temperature within the same room as where thermostat device 102 is located. In particular, processing circuitry 104 may execute temperature compensation model 120 to determine the difference between the temperature sensed by temperature sensor 132 and the ambient temperature. Such a difference may be referred to herein as a dynamic factor. Because temperature sensor 132 is inside a housing 160 of the thermostat device 102 and in proximity of heat-generating electronic components such as processing circuitry 104 and memory 105, the temperature sensed by temperature sensor 132 may be higher than the ambient temperature. Thus, processing circuitry 104 may subtract the determined difference from the temperature sensed by temperature sensor 132 to determine the ambient temperature.

Processing circuitry 104 may execute temperature compensation model 120 to determine the dynamic factor for the temperature sensed by temperature sensor 132 based on one or more factors and/or a combination of factors. One factor is the operating mode of thermostat device 102. Thermostat device 102 may operate in one of many different operating modes which may affect the dynamic factor which may be based at least in part on whether current is flowing through one or more of fan relay 106, heat relay 108, and cool relay 110, as described in more detail below.

Because temperature sensor 130 and temperature sensor 132 are mounted completely inside the housing 160 of thermostat device 102, and not in contact with the ambient room air, temperature sensor 130 and temperature sensor 132 are more susceptible to changes in operating mode, and current through thermostat device 102, than other examples of thermostats which may include one or more sensors mounted outside of the housing 160. In other words, When the current starts flowing through the relays and the board, the temperature inside the housing 160 of thermostat device 102 may quickly increase. When the current is interrupted the temperature may decrease. As such, the operating mode of thermostat device 102 may affect the determination of the dynamic factor.

In some examples, another factor is the style of base of thermostat device 102. The style of base of thermostat device 102 is associated with whether thermostat device 102 is currently being powered by A/C power, whether thermostat device 102 is currently being powered by battery power, and/or whether backlight 107 of display 112 is currently on. These different styles of bases of thermostat device 102 may produce different amounts of heat within the housing 160 of thermostat device 102 and may therefore affect the determination of the dynamic factor.

In some examples, another factor is the operating voltage of thermostat device 102 to operate thermostat device 102 and the amount of current flowing through fan relay 106, heat relay 108, and cool relay 110 while thermostat device 102 is in operation. In some examples, temperature sensor 130 may use two temperature sensors—temperature sensor 130 and temperature sensor 132 in order to determine the operating voltage of thermostat device 102 to operate thermostat device 102 and to determine the amount of current flowing through fan relay 106, heat relay 108, and cool relay 110 while thermostat device 102 is in operation. Processing circuitry 104 may execute load recognition model 122 to determine the operating voltage of thermostat device 102 to operate thermostat device 10 and determine the amount of current flowing through fan relay 106, heat relay 108, and cool relay 110 based at least in part on the difference between the temperature values sensed by temperature sensor 130 and temperature sensor 132.

In some examples, instead of using two temperature sensors—temperature sensor 130 and temperature sensor 132 in order to determine the operating voltage of thermostat device 102 to operate thermostat device 102 and to determine the amount of current flowing through fan relay 106, heat relay 108, and cool relay 110 while thermostat device 102 is in operation, thermostat device 102 may instead use voltage measurement circuitry 109 to determine the operating voltage of thermostat device 102 to operate thermostat device 102. In this case, thermostat device 102 may not include thermostat sensor 130 and may not include load recognition model 122 as thermostat device 102 may be able to use a single temperature sensor—temperature sensor 130 to perform temperature compensation to determine the ambient temperature. On the other hand, if thermostat device 102 uses both temperature sensor 130 and temperature sensor 132 to determine the operating voltage of thermostat device 102 to operate thermostat device 102 and to determine the amount of current flowing through fan relay 106, heat relay 108, and cool relay 110 while thermostat device 102 is in operation, then thermostat device 102 may not include voltage measurement circuitry 109.

In some examples, voltage measurement circuitry 109 may be any suitable circuitry configured to measure the operating voltage of thermostat device 102 to operate thermostat device 102. In the case where thermostat device 102 includes voltage measurement circuitry 109 to measure the operating voltage of thermostat device 102 to operate thermostat device 102, thermostat device 102 may also be able to determine the amount of current flowing through fan relay 106, heat relay 108, and cool relay 110 while thermostat device 102 is in operation without including temperature sensor 130 in thermostat device 102. For example, processing circuitry 104 may determine a fixed current level that is used for the purposes of temperature compensation. In some examples, processing circuitry 104 may use an average amount of current flowing through fan relay 106, heat relay 108, and cool relay 110 while thermostat device 102 that was determined via experimentation over a set of different situations.

In some examples, temperature compensation model 120 used by thermostat device 102 to perform temperature compensation to determine the ambient temperature from the temperature measured by temperature sensor 132 include a neural network model or function that has been generated via machine learning, as described in detail below. For example, during the training phase for temperature compensation model 120, temperature compensation model 120 may be trained using sets of temperatures measured by a temperature sensor, bases, operating modes, current levels, operating voltages, and ambient temperatures as training data to generate the neural network algorithm of temperature compensation model 120.

Similarly, load recognition model 122 used by the thermostat device 102 to estimate the operating voltage of thermostat 102 and to estimate the amount of current flowing through fan relay 106, heat relay 108, and cool relay 110 may also include a neural network model that has been generated via machine learning, as described in detail below. For example, during the training phase for load recognition model 122, load recognition model 122 may be trained using sets of temperatures measured by both temperature sensor 130 and temperature sensor 132, current levels, and operating voltages to generate the neural network algorithm for load recognition model 122.

As such, in accordance with the techniques of the present disclosure, processing circuitry 104 of thermostat device 102 may execute temperature compensation model 120 to determine the ambient temperature outside housing 160 of thermostat device 102 based at least in part on the temperature sensed by temperature sensor 132 that is within housing 160 of thermostat device 102. In some examples, processing circuitry 104 may determine the current operating mode of processing circuitry 104 out of a plurality of operating modes, and processing circuitry 104 may execute temperature compensation model 120 to determine the ambient temperature outside of housing 160 of thermostat device 102 based at least in part on the temperature sensed by temperature sensor 132 and the current operating mode of thermostat device 102. In response to determining the ambient temperature, processing circuitry 104 may output the determined ambient temperature at display 112.

In some examples, processing circuitry 104 may use factors other than the current operating mode of thermostat device 102 to perform temperature compensation to determine the ambient temperature from the temperature sensed by temperature sensor 132. In some example, processing circuitry 104 may execute temperature compensation model 120 to determine the ambient temperature outside of housing 160 of thermostat device 102 based at least in part on the temperature sensed by temperature sensor 132, the current operating mode of thermostat device 102, the operating voltage of thermostat device 102, the amount of current flowing through fan relay 106, heat relay 108, and/or cool relay 110, the base of the thermostat device 102, and/or any combinations thereof.

The techniques described herein enables thermostat device 102 to minimize the amount of temperature sensors that are used to perform temperature compensation to determine the ambient temperature of the immediate environs of thermostat device 102 without use of one or more temperature sensors that are disposed outside of the housing 160 of thermostat device 102. In some examples, the techniques described herein enables thermostat device to use a single temperature sensor—temperature sensor 132 to perform such temperature compensation if thermostat device 102 includes voltage measurement circuitry 109 for determining the operating voltage of thermostat device 102. In some examples, if temperature device 102 does not include voltage measurement circuitry 109 for determining the operating voltage of thermostat device 102, temperature device 102 may use two temperature sensors—temperature sensor 130 and temperature sensor 132 to estimate the amount of current flowing through fan relay 106, heat relay 108, and/or cool relay 110 and the operating voltage of thermostat device 102 in order to perform temperature compensation.

By minimizing the number of temperature sensors that are used by thermostat device 102 to perform temperature compensation, the techniques disclosed herein thereby provides the technical advantage of minimizing the amount of power used by temperature sensors in a thermostat device, thereby enabling the temperature compensation techniques disclosed herein to be implemented in a low-voltage thermostat. Further, by minimizing the number of temperature sensors that are used by thermostat device 102 to perform temperature compensation, the techniques disclosed herein also enables thermostat devices to be physically smaller compared with thermostat devices that may include more than two temperature sensors (e.g., five temperature sensors or more).

As described above, the temperature sensed by temperature sensor 132 within housing 160 may be higher than the ambient temperature outside of housing 160 due to heat produced by components within housing 160 being trapped within housing 160 and therefore heating the air as well as heating electronics control board 150. As thermostat device 102 continues to operate, the difference between the temperature sensed by temperature sensor 132 within housing 160 and the ambient temperature outside of housing 160 may increase or decrease until the temperature difference reaches an equilibrium level.

Figure 2:
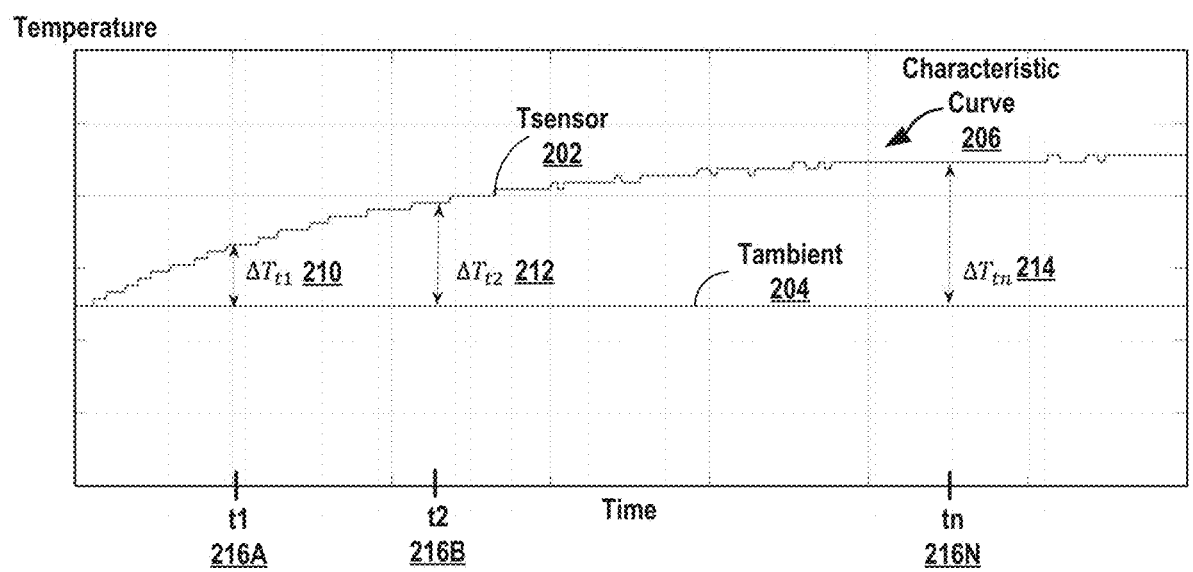
FIG. 2 is a time graph illustrating a characteristic heating curve measured by a temperature sensor in a thermostat device according to one or more aspects of the present disclosure.

FIG. 2 is a time graph illustrating a characteristic heating curve measured by a temperature sensor in a thermostat device according to one or more aspects of the present disclosure. When a thermostat device, such as thermostat device 102 described above in relation to FIG. 1, is on and when components within housing 160 heats up, the temperature Tsensor 202 measured by temperature sensor 132 of thermostat device 102 may behave as illustrated in FIG. 2. The temperature Tsensor 202 measured by temperature sensor 132 over time may be referred to herein as characteristic curve 206, which is also referred to herein as a temperature curve. When the difference between the temperature Tsensor 202 measured by temperature sensor 132 and the ambient temperature Tambient 204 increases over time, the characteristic curve may also be referred to as a characteristic heating curve or a heating curve. Conversely, when the difference between the temperature Tsensor 202 measured by temperature sensor 132 and the ambient temperature Tambient 204 decreases over time, the characteristic curve may also be referred to as a characteristic cooling curve or a cooling curve.

As shown in FIG. 2, as the ambient temperature Tambient 204 remains stable over time, the difference between the temperature Tsensor 202 measured by temperature sensor 132 and the ambient temperature Tambient 204 may vary over time. This may reflect that electronic circuit board 150 on which temperature sensor 132 is disposed may heat up over time, as in the case of FIG. 2, or may cool down over time. Thus, in characteristic curve 206, a specific value for the temperature Tsensor 202 measured by temperature sensor 132 may be associated with a time. In some examples time is represented by a counter, which may be incremented by a predetermined duration. For example, each count may be one second long, four seconds long or some other duration. As such, a specific value for the temperature Tsensor 202 measured by temperature sensor 132 may be associated with a counter value.

At the beginning of time (i.e. counter=zero), such as immediately upon powering on thermostat device 102, the temperature Tsensor 202 measured by temperature sensor 132 and the ambient temperature Tambient 204 are at thermal equilibrium. Therefore, Tsensor 202 is approximately equal to Tambient 204. In the example of FIG. 2, as the thermostat device 102 is powered, electronics circuit board 150 of thermostat device 102 may heat up over time. The temperature, Tsensor 202, measured by, for example temperature sensor 132, may therefore increase above the ambient temperature Tambient 204 over time until reaching a steady state.

The difference between the temperature Tsensor 202 measured by a temperature sensor and the ambient temperature Tambient 204 is denoted as ΔT, also known as the dynamic factor. The change in temperature ΔT measured by the temperature sensor may be described by the following equation:

$$\Delta T = T\text{sensor} - T\text{ambient},$$

where the dynamic factor ΔT a function of time (e.g. $\Delta T = f(t)$).

In the example of FIG. 2, at time t1 216A, the difference between the temperature Tsensor 202 measured by temperature sensor 132 and the ambient temperature Tambient 204 is denoted as ΔTt1 210. At time t2 216A, the difference between the temperature Tsensor 202 measured by temperature sensor 132 and the ambient temperature Tambient 204 is denoted as ΔTt2 212 and is greater than ΔTt1 210. At time to 216N, the difference between the temperature Tsensor 202 measured by a temperature sensor and the ambient temperature Tambient 204 is denoted as ΔTtn 210 and is greater than ΔTt1 210.

The temperature compensation techniques, such as performed by temperature compensation model 120 of thermostat device 102, may include subtracting the dynamic factor ΔT from the value of the temperature Tsensor 202 measured by temperature sensor 132 to determine a compensated temperature, which may approximate the ambient temperature Tambient 204, e.g.: Tcomp=Tsensor−ΔT. The dynamic factor may also be referred to as a temperature compensation factor in this disclosure.

As can be seen in FIG. 2, to determine the ambient temperature Tambient 204 given a temperature Tsensor 202 measured by temperature sensor 132 that acts over time according to characteristic curve 206, thermostat device 102 may determine the dynamic factor ΔT for points along characteristic curve 206. Thus, given a value of temperature Tsensor 202 measured by temperature sensor 132, thermostat device 102 may determine the point on characteristic curve 206 that is associated with the value of temperature Tsensor 202 measured by temperature sensor 132, and may determine the dynamic factor ΔT associated with that point on characteristic curve 206. Thermostat device 102 may subtract the dynamic factor ΔT associated with that point on characteristic curve 206 from the value of temperature Tsensor 202 measured by temperature sensor 132 associated with the same point on characteristic curve 206 to determine the ambient temperature Tambient 204.

Thermostat device 102 may operate in a variety of operating modes. As described above, thermostat device 102 may operate in one of many different operating modes associated with whether current is flowing through one or more of fan relay 106, heat relay 108, and cool relay 110. In some examples, thermostat device 102 may operate in one of five operation modes:

| | |
|---|---|
| Operating Mode 1 (OM1): | thermostat device 102 is on and no current is flowing through any of fan relay 106, heat relay 108, and cool relay 110; |
| Operating Mode 2 (OM2): | current is flowing through fan relay 106; |
| Operating Mode 3 (OM3): | current is flowing through heat relay 108; |
| Operating Mode 4 (OM4): | current is flowing through fan relay 106 and heat relay 108; and |
| Operating Mode 5 (OM5): | current is flowing through fan relay 106 and cool relay 110. |

Figure 3:
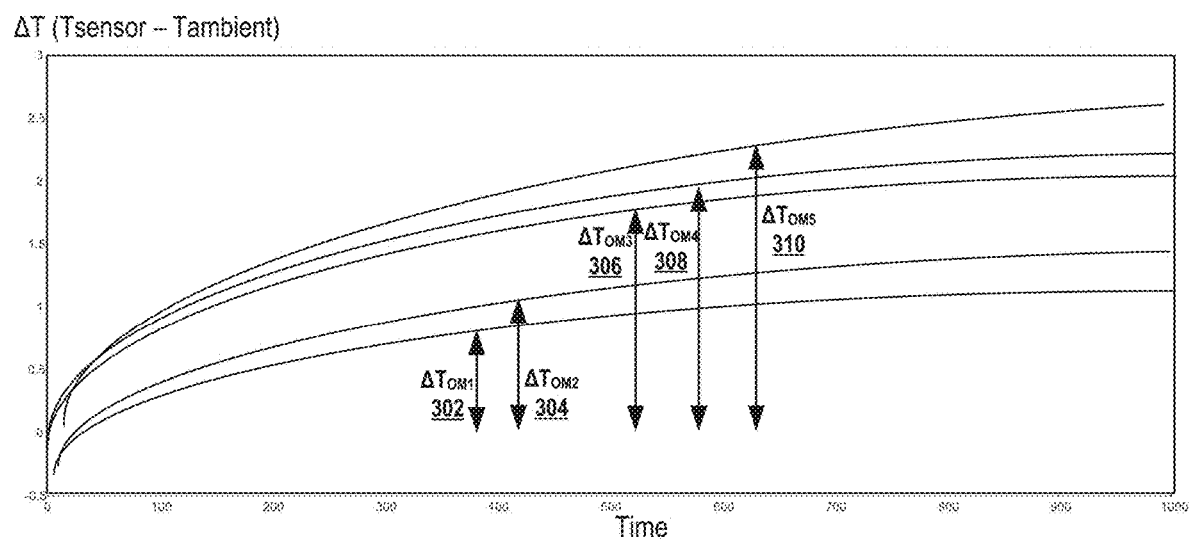
FIG. 3 is a time graph illustrating the characteristic temperature curve of a temperature sensor of a thermostat device operating in a variety of operating modes according to one or more aspects of the present disclosure.

FIG. 3 is a time graph illustrating the characteristic temperature curve of a temperature sensor of a thermostat device operating in a variety of operating modes according to one or more aspects of the present disclosure. As can be seen, the difference ΔT between the temperature measured by the temperature sensor and the ambient temperature may differ depends on the operating mode of the thermostat device.

As shown in FIG. 3, the difference between the temperature measured by temperature sensor 132 and the ambient temperature while thermostat device 102 is operating in OM1 is denoted as $\Delta T_{OM1}$ 302. The difference between the temperature measured by temperature sensor 132 and the ambient temperature while thermostat device 102 is operating in OM2 is denoted as $\Delta T_{OM2}$ 304. The difference between the temperature measured by temperature sensor 132 and the ambient temperature while thermostat device 102 is operating in OM3 is denoted as $\Delta T_{OM3}$ 306. The difference between the temperature measured by temperature sensor 132 and the ambient temperature while thermostat device 102 is operating in OM4 is denoted as $\Delta T_{OM4}$ 308. The difference between the temperature measured by temperature sensor 132 and the ambient temperature while thermostat device 102 is operating in OM5 is denoted as $\Delta T_{OM5}$ 310.

As can be seen, the difference in temperature between the temperature measured by temperature sensor 132 and the ambient temperature may be different depending on the operating mode of thermostat device 102. Thus, not only is the dynamic factor ΔT a function of time, the dynamic factor ΔT may be a function of time and the operating mode (OM) of thermostat device 102 (e.g. ΔT=ƒ(t, OM)).

Further, while five operating modes are illustrated in FIG. 3, the number of different operating modes can be reduced from five modes to three modes. For example, the temperature difference $\Delta T_{OM1}$ 302 for OM1 is very similar to the temperature difference $\Delta T_{OM2}$ 304 for OM2, so that OM1 and OM2 can be combined into a single operating mode. Similarly, the temperature difference $\Delta T_{OM3}$ 306 for OM3 is very similar to the temperature difference $\Delta T_{OM4}$ 308 for OM4, so that OM3 and OM4 can be combined into a single operating mode. Meanwhile, the remaining temperature difference $\Delta T_{OM5}$ 310 for OM5 is not similar to OM1-OM4 so that OM5 may be a third operating mode. As such, the five operating modes for thermostat device 102 may be reduced to three operating modes that are used throughout this disclosure, as follows:

| | |
|---|---|
| Operating Mode 1 (OM1): | 1) thermostat device 102 is on and no current is flowing through any of fan relay 106, heat relay 108, and cool relay 110 OR 2) current is flowing through fan relay 106; |
| Operating Mode 2 (OM2): | 1) current is flowing through heat relay 108 OR 2) current is flowing through fan relay 106 and heat relay 108; and |
| Operating Mode 3 (OM3): | current is flowing through fan relay 106 and cool relay 110. |

The temperature difference ΔT between the temperature measured by temperature sensor 132 and the ambient temperature may also depend on the style of base of thermostat device 102. The base of thermostat device 102 is associated with whether thermostat device 102 is currently being powered by A/C power, whether thermostat device 102 is currently being powered by battery power, and/or whether backlight 107 of display 112 is currently on. For example, a first style of base (B1) of thermostat device 102 may be thermostat device 102 operating on battery power, a second style of base (B2) of thermostat device 102 may be thermostat device 102 running on A/C power, and a third style of base (B3) of thermostat device 102 may be backlight 107 of display 112 being currently on.

These different based of thermostat device 102 may produce different amounts of heat within the housing 160 of thermostat device 102 and may therefore affect the temperature difference ΔT between the temperature measured by temperature sensor 132 and the ambient temperature. Thus, the dynamic factor ΔT may be a function of time the operating mode of thermostat device 102, as well as the base (B) of thermostat device 102 (e.g. ΔT=ƒ(t, OM, B)).

The temperature difference ΔT between the temperature measured by temperature sensor 132 and the ambient temperature may also depend on the operating voltage of thermostat device 102 and the amount of current flowing through fan relay 106, heat relay 108, and cool relay 110 while thermostat device 102 is in operation. Thus, the dynamic factor ΔT may be a function of time (t), the operating mode (OM) of thermostat device 102, the base (B) of thermostat device 102, the operating voltage of thermostat device 102, and the amount of current flowing through fan relay 106, heat relay 108, and cool relay 110 (e.g. ΔT=ƒ(t, OM, B, Voltage, Current)).

Figure 4:
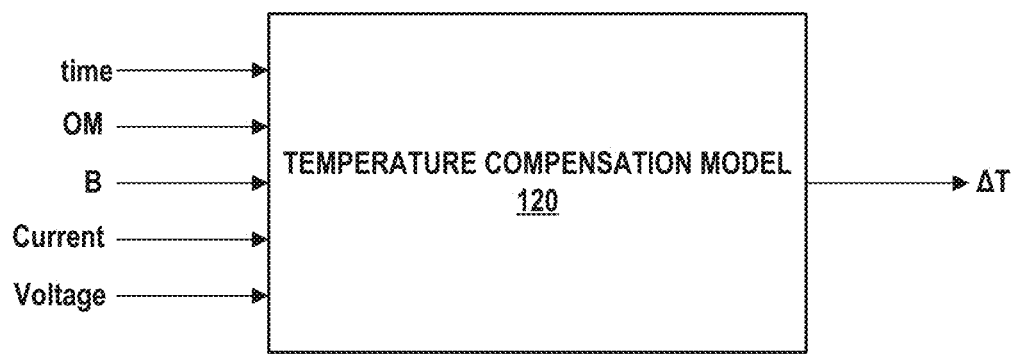
FIG. 4 illustrates an example temperature compensation model for determining an output that is the difference between the temperature measured by the temperature sensor and the ambient temperature according to one or more aspects of the present disclosure.

FIG. 4 illustrates an example temperature compensation model for determining an output that is the difference between the temperature measured by the temperature sensor and the ambient temperature according to one or more aspects of the present disclosure. Such a difference is referred to as the dynamic factor ΔT. As described above, the dynamic factor ΔT may be a function of time (t), the operating mode (OM) of thermostat device 102, the base (B) of thermostat device 102, the operating voltage of thermostat device 102, and the amount of current flowing through fan relay 106, heat relay 108, and cool relay 110 (e.g. ΔT=ƒ(t, OM, B, Voltage, Current)).

Temperature compensation model 120 may implement a neural network algorithm in order to implement the function ƒ(t, OM, B, Voltage, Current) that takes as inputs the time, the operating mode, the base, the operating voltage, and the amount of current, as described above, to generate the dynamic factor ΔT. For example, temperature compensation model 120 may be trained via any suitable machine learning technique using training data that includes sets of time, the operating mode, the base, the operating voltage, the amount of current, the dynamic factor ΔT to generate temperature compensation model 120. Examples of the neural network algorithm implemented by temperature compensation 120 may include convolutional neural networks, recurrent neural networks, and the like.

Figure 5:
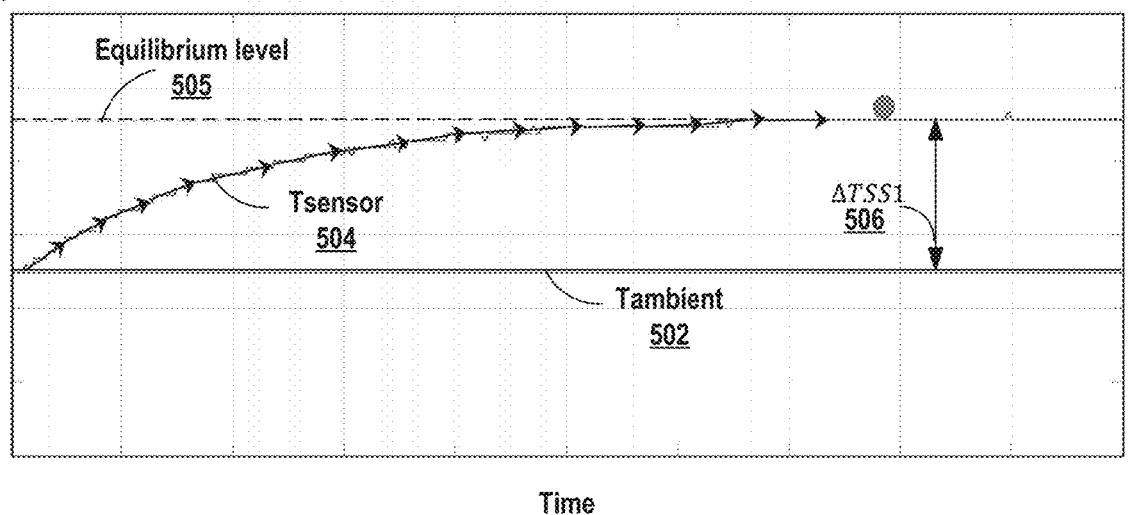
FIG. 5 is a time graph illustrating the heating curve of a temperature sensor of a thermostat device that reaches an equilibrium level according to one or more aspects of the present disclosure.

FIG. 5 is a time graph illustrating the heating curve of a temperature sensor of a thermostat device that reaches an equilibrium level according to one or more aspects of the present disclosure. As shown in FIG. 5, when thermostat device 102 operates at a certain condition, where the operating mode, the base, the current, and the operating voltage are constant, the difference between the ambient temperature Tambient 502 and temperature Tsensor 504 measured by temperature sensor 132 may change as the interior of the thermostat device 102's housing 160 heats up until the difference between the ambient temperature Tambient 502 and temperature Tsensor 504 measured by temperature sensor 132 reaches an equilibrium level 505, in which the difference between the ambient temperature Tambient 502 and temperature Tsensor 504 measured by the temperature sensor remains approximately constant within some small range of variability. When the difference between the ambient temperature Tambient 502 and temperature Tsensor 504 measured by temperature sensor 132 reaches an equilibrium level 505, the difference between the ambient temperature Tambient 502 and temperature Tsensor 506 measured by the temperature sensor may be represented as a steady state temperature difference for the heating curve, such as steady state temperature difference $\Delta TSS1$ 506. As can be seen each of cooling curves and heating curves associated with different operating modes, different bases, different operating voltages, different amounts of current may increase or decrease in temperature over time until the heating curve reaches a steady state temperature difference to the ambient temperature.

Figure 6:
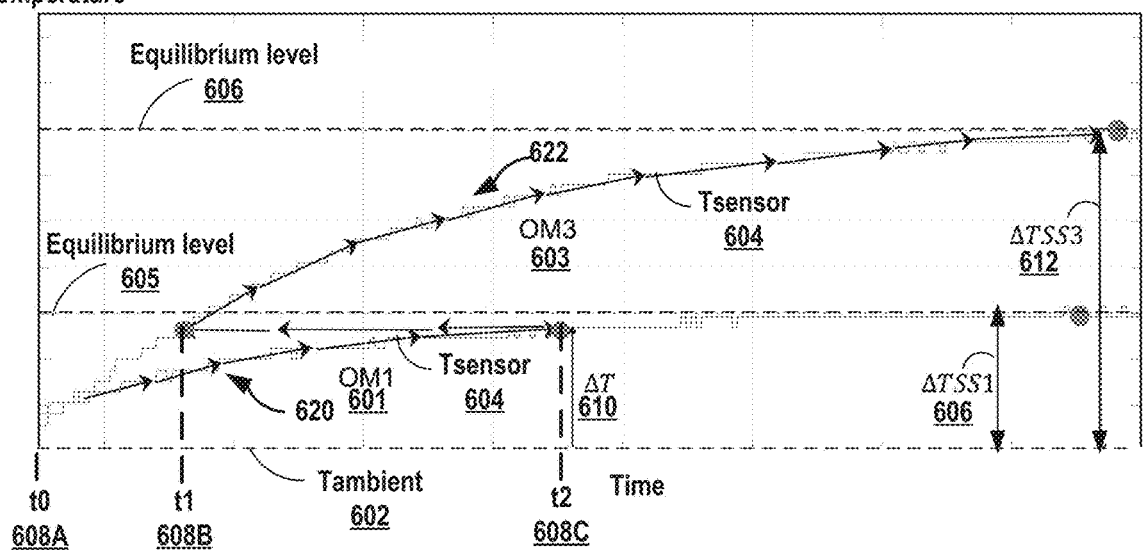
FIG. 6 is a time graph illustrating heating curves of a temperature sensor when the thermostat device changes its operating mode according to one or more aspects of the present disclosure.

FIG. 6 is a time graph illustrating heating curves of a temperature sensor when the thermostat device changes its operating mode according to one or more aspects of the present disclosure. When a thermostat device changes operating modes from an initial operating mode (OMi) to a new operating mode (OM), the temperature curve may behave according to the temperature curve of the new operating mode when the board is heated. As shown in FIG. 6, when thermostat device 102 operates at a certain condition, where the base, the current, and the voltage are constant, and when the operating mode of thermostat device 102 changes from an initial operating mode OMi to a new operating mode OM, the difference between the ambient temperature and temperature measured by temperature sensor 132 may behave over time according to the characteristic curve of the new operating mode.

In the example of FIG. 6, thermostat device 102 may operate starting at time t0 608A in operating mode 1 (OM1) 601 until it reaches time t2 608C, upon which thermostat device 102 may switch from operating at OM1 601 to operating at operating mode 3 (OM3) 603. Thus the temperature Tsensor 604 measured by temperature sensor 132 may track along heating curve 620 associated with OM1 until time t2 608C at which time the temperature Tsensor 604 measured by temperature sensor 132 may track along heating curve 622 associated with OM3.

Tsensor 604 tracking along a characteristic curve such as heating curve 620 may refer to Tsensor 604 changing over time according to the characteristic curve that is tracked. In the example of FIG. 6, Tsensor 604 may track along heating curve 620 by increasing its value over time according to heating curve 620. Because a dynamic factor $\Delta T$ can be determined for each point along a characteristic curve, such as heating curve 620, thermostat device 102 may be able to determine a dynamic factor $\Delta T$ for a value of Tsensor 604 that tracks along a characteristic curve by determining the point on the characteristic curve associated with the value of Tsensor 604 to determine the dynamic factor $\Delta T$ for the value of Tsensor 604.

At time t2 608C, the difference between Tsensor 604 and Tambient 602 on heating curve 620 is the dynamic factor $\Delta T$ 610, which is less than the steady state temperature difference $\Delta TSS_1$ 606 when Tsensor 604 reaches equilibrium level 605 for OM1 601. Note that the difference between the temperature Tsensor 604 tracking along heating curve 622 at time t2 608C is different (larger) than the dynamic factor $\Delta T$ 610 at time t2 608C. Thus, when the operating mode changes from OM1 601 to OM3 603 at time t2 608C, the point of heating curve 622 associated with Tsensor 604 having a dynamic factor $\Delta T$ equal to dynamic factor $\Delta T$ 610 is not the point of heating curve 622 associated with time t2 608C, which is the time at which the operating mode changes from OM1 601 to OM3 603.

Instead, the point of heating curve 622 associated with Tsensor 604 having a dynamic factor $\Delta T$ equal to dynamic factor $\Delta T$ 610 is the point of heating curve 622 associated with time t1 608B. In other words, had thermostat device 102 started operating in OM3 603 starting at time t0 608A, dynamic factor $\Delta T$ 610 associated with Tsensor 604 that tracks along heating curve 622 would have been equal to dynamic factor $\Delta T$ 610 at time t1 608B, which is prior to time t2 608C. Thus, when an operating mode change occurs so that the temperature sensed by a temperature sensor switches from tracking along a characteristic curve of the previous operating mode to a new characteristic curve (e.g., a heating curve or a cooling curve) of a new operating mode, the thermostat may determine the point on the new characteristic curve that corresponds to the dynamic factor $\Delta T$ on the previous characteristic curve at the point where the operating mode switch occurs, and may star tracking according to the new characteristic curve at the determined point.

As such, in order to perform temperature compensation in response to the thermostat device switching operating modes, thermostat device 102 may have to determine a starting point on heating curve 622 that corresponds to dynamic factor $\Delta T$ 610. Thus, thermostat device may start tracking along heating curve 622 not at time t2 608C when the change in operating mode occurs, but at the starting point of time t1 608B where according to heating curve 622 the difference between Tsensor 606 and Tambient 602 is the same as dynamic factor $\Delta T$ 610 at time t2 608C.

In some examples, rather than just using the time that has elapsed since time t0 608A in performing temperature compensation, thermostat device 102 may keep track of time by keeping track of a counter value that thermostat device 102 may increment or decrement. For example, starting at time t0 608A, thermostat device 102 may increment the counter by a predetermined duration, such as one second long, four seconds long, and the like, that corresponds to the passage of time since time t0 608A as Tsensor 604 tracks along heating curve 620.

When the time reaches time t2 608C and the operating mode change occurs from OM1 to OM3, thermostat device 102 may decrement the counter value to the time (i.e., time t1 608B) that corresponds to the Tsensor 604 along heating curve 622 for OM3, such that the difference between Tsensor 604 and Tambient 602 being dynamic factor $\Delta T$ 610. In the example of FIG. 6, thermostat device 102 may decrement the counter value to correspond to time t1 608B because at time t1 608B the difference between Tsensor 604 that tracks along heating curve 622 for OM3 and the ambient temperature Tambient is equal to the value of dynamic factor ΔT 610 at the time where the change in operating mode occurs.

While FIG. 6 illustrates an example where changing the operating mode of the thermostat device causes the electronic circuit board of the thermostat device to heat, in some instances, changing the operating mode may cause electronic circuit board 150 to cool. Changing the operating mode of thermostat device 102 may cause electronic circuit board 150 to heat or cool, depending on the value of dynamic factor ΔT at the time the change in operating mode occurs compared with the value of steady state difference of ΔTSS of the new operating mode.

If the value of the dynamic factor ΔT at the time the change in operating mode is smaller than the value of steady state difference of ΔTSS of the new operating mode, then the change in the operating mode may cause electronic circuit board 150 to heat up (increase in temperature). On the other hand, if the value of the dynamic factor ΔT at the time the change in operating mode is larger than the value of steady state difference of ΔTSS of the new operating mode, then the change in the operating mode may cause electronic circuit board 150 to cool down (decrease in temperature).

Figure 7:
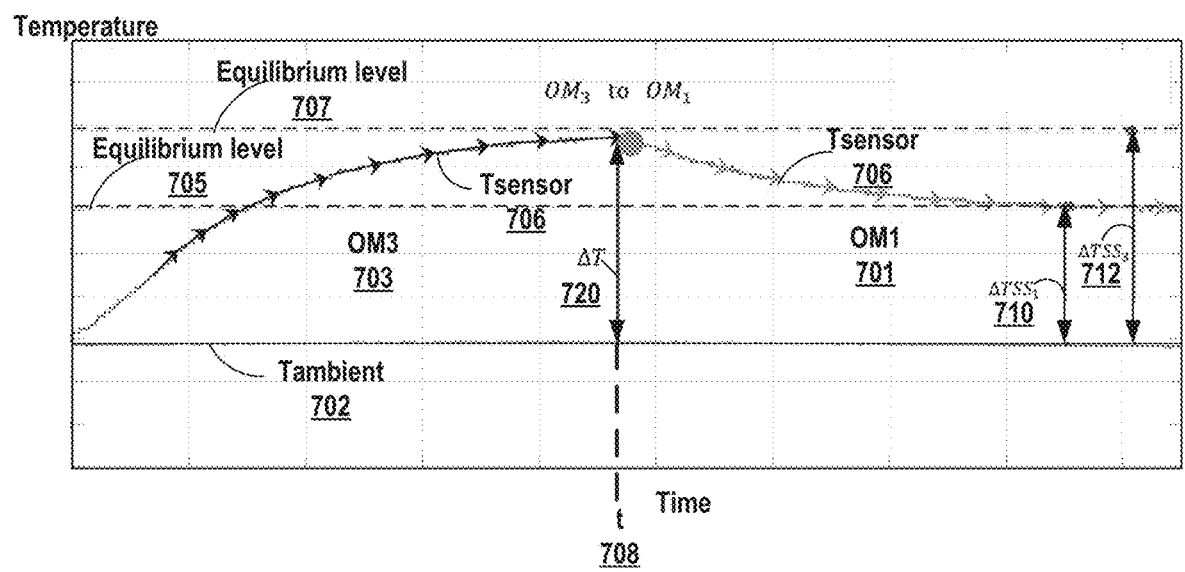
FIG. 7 is a time graph illustrating an example where changing the operating mode of the thermostat device causes the electronic circuit board of the thermostat device to cool according to one or more aspects of the present disclosure.

FIG. 7 is a time graph illustrating an example where changing the operating mode of the thermostat device causes the electronic circuit board of the thermostat device to cool according to one or more aspects of the present disclosure. As shown in FIG. 7, temperature Tsensor 706 measured by temperature sensor 132 of thermostat device 102 may decrease (e.g., cool) when the operating mode of thermostat device 102 changes from OM3 703 to OM1 701 at time t 708.

The steady state temperature difference ΔTSS3 712 when Tsensor 706 measured by temperature sensor 132 of thermostat device 102 operating at OM3 703 reaches equilibrium level 707 is larger than the steady state temperature difference ΔTSS1 712 when the temperature Tsensor 706 measured by temperature sensor 132 of thermostat device 102 operating at OM1 701 reaches equilibrium level 705. Thus, when thermostat device 102 operates at OM3 703, the dynamic factor ΔT 720 may also be larger than the steady state temperature difference ΔTSS1 712. If the dynamic factor ΔT 720 is larger than the steady state temperature difference ΔTSS1 712 when thermostat device 102 changes operating modes from OM3 703 to OM1 701 at time t 708, temperature Tsensor 706 may decrease towards equilibrium level 705 when the operating mode of thermostat device 102 changes from OM3 703 to OM1 701 at time t 708.

Figure 8:
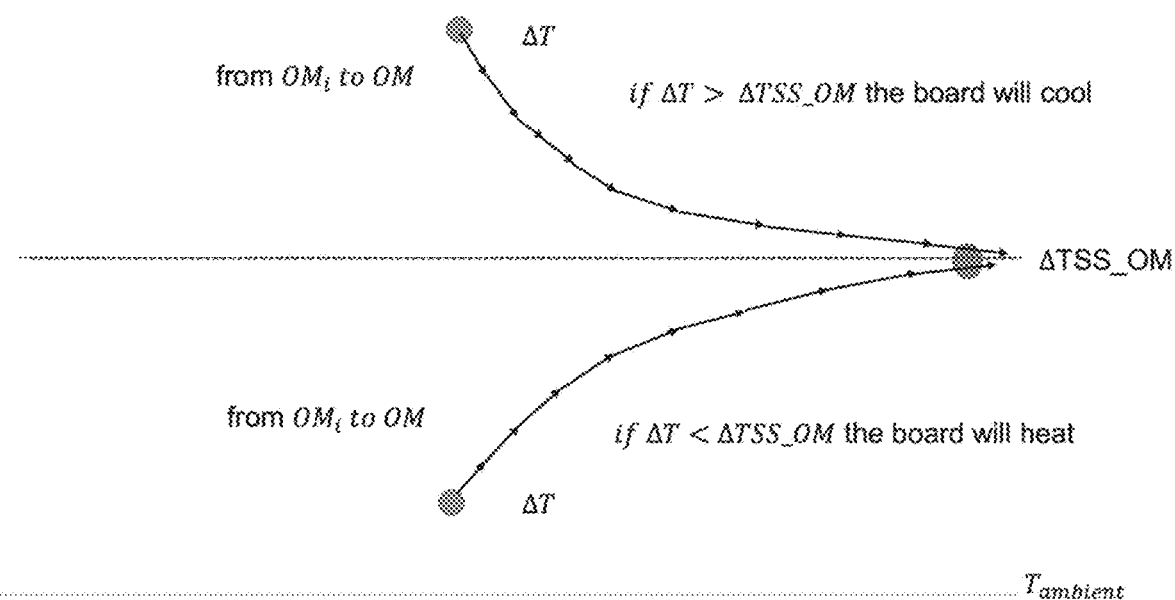
FIG. 8 illustrates an example technique for determining whether an example electronic circuit board of a thermostat device may heat up or cool down in response to a change in operating mode of the thermostat device according to one or more aspects of the present disclosure.

FIG. 8 illustrates an example technique for determining whether an example electronic circuit board of a thermostat device may heat up or cool down in response to a change in operating mode of the thermostat device according to one or more aspects of the present disclosure. As shown in FIG. 8, whether temperature sensor 132 of thermostat device 102 measures an increase or a decrease in temperature in response to thermostat device 102 changing thermostat device 102's operating mode from an initial operating mode (OMi) to a new operating mode (OM) may depend on the value of the dynamic factor ΔT at the time the operating mode change occurs and the steady state temperature difference ΔTSS_OM of the new operating mode. In particular, electronic circuit board 150 may cool if the dynamic factor ΔT is greater than the steady state temperature difference ΔTSS_OM of the new operating mode (e.g., ΔT>ΔTSS_OM), and electronic circuit board 150 may heat up if the dynamic factor ΔT is less than the steady state temperature difference ΔTSS_OM of the new operating mode (e.g., ΔT<ΔTSS_OM).

As discussed above, the characteristic curves of temperature sensed by temperature sensor 132 of thermostat device 102 may include both heating curves that correspond to electronic circuit board 150 heating up as well as cooling curves that correspond to electronic circuit board 150 cooling down. Thus, a variety of cooling curves and heating curves may be used as training data to train temperature compensation model 120.

Figure 9:
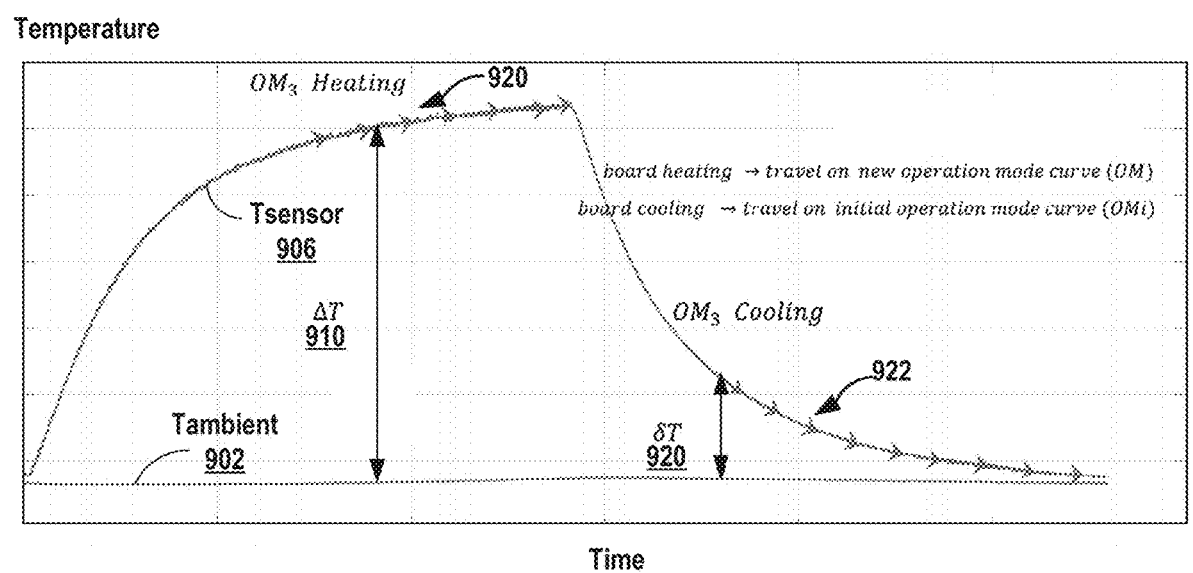
FIG. 9 is a time graph illustrating an example where changing the operating mode of the thermostat device causes the electronic circuit board of the thermostat device change from heating to cooling according to one or more aspects of the present disclosure.

FIG. 9 is a time graph illustrating an example where changing the operating mode of the thermostat device causes the electronic circuit board of the thermostat device change from heating to cooling according to one or more aspects of the present disclosure. As shown in FIG. 9, when the characteristic curve increases, such as heating curve 920, the difference between temperature Tsensor 906 measured by temperature sensor 132 of thermostat device 102 and the ambient temperature Tambient 902 is a heating dynamic factor ΔT 910. Meanwhile, when the characteristic curve decreases, such as cooling curve 922, the difference between temperature Tsensor 906 measured by temperature sensor 92 of thermostat device 102 and Tambient 902 is a cooling dynamic factor δT 920. To construct temperature compensation model 120, both board heating curves and board cooling curves such as shown in FIG. 9 may be used as training data to train temperature compensation model 120.

The mathematical expression for temperature compensation may depend upon whether electronic circuit board 150 is heating up or cooling down. While electronic circuit board 150 is heating up, thermostat device 102 may use a heating dynamic factor to perform temperature compensation to determine the ambient temperature. Conversely, while electronic circuit board 150 is cooling down, thermostat device 102 may use a cooling dynamic factor to perform temperature compensation to determine the ambient temperature.

Figure 10:
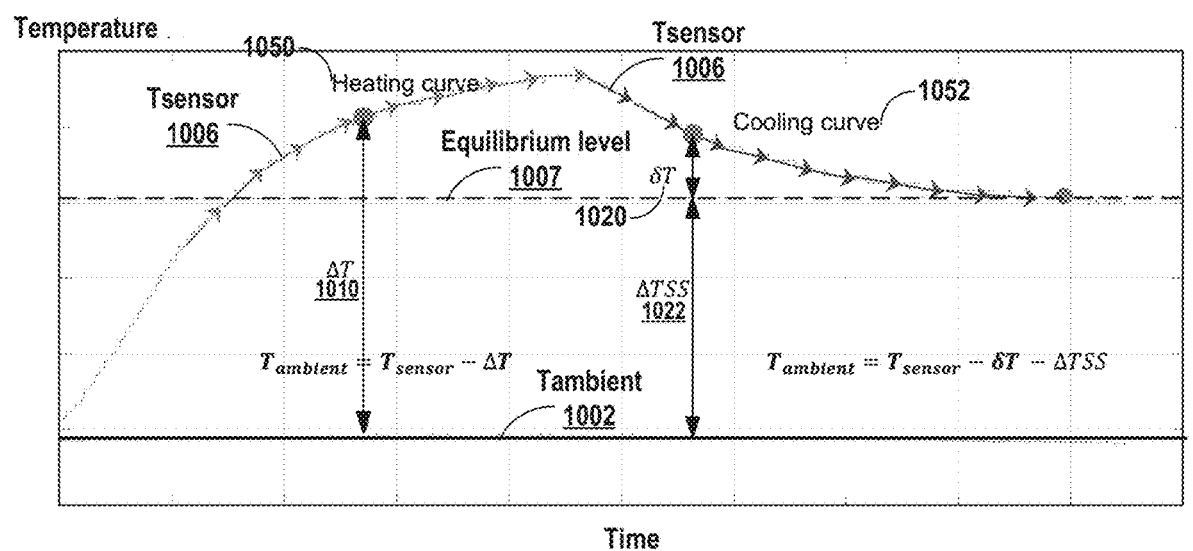
FIG. 10 is a time graph illustrating techniques for performing temperature compensation based on whether the electronic circuit board of the thermostat device is heating or cooling according to one or more aspects of the present disclosure.

FIG. 10 is a time graph illustrating techniques for performing temperature compensation based on whether the electronic circuit board of the thermostat device is heating or cooling according to one or more aspects of the present disclosure. As shown in FIG. 10, as electronic circuit board 150 of thermostat device 102 heats up, the temperature Tsensor 1006 measured by temperature sensor 132 may rise according to heating curve 1050. As Tsensor 1006 follows heating curve 1050, the difference between Tsensor 1006 and ambient temperature Tambient 1002 is a heating dynamic factor ΔT 1010 (e.g., Tambient=Tsensor−ΔT).

As electronic circuit board 150 cools down, the temperature Tsensor 1006 measured by temperature sensor 132 may decrease according to cooling curve 1052 until it reaches an equilibrium level 1007 for cooling curve 1052. When Tsensor 1006 reaches equilibrium level 1007, Tsensor 1006 may reach a steady state temperate such that the difference between Tsensor 1006 and Tambient is the steady state temperature difference 1022 for cooling curve 1052.

While Tsensor 1006 travels along cooling curve 1052 and before Tsensor 1006 reaches equilibrium level 1007, the difference between Tsensor 1006 and equilibrium level 1007 is a cooling dynamic factor δT 1020. Thus, while electronic circuit board 150 cools, Tambient 1002 is equal to Tsensor 1006 minus cooling dynamic factor δT 1020 minus the steady state temperature difference ΔTSS 1022 between equilibrium level 1007 and Tambient 1002 (e.g., Tambient=Tsensor−δT−ΔTSS).

Heating and cooling curves for thermostat devices operating at different operating modes, different bases, different voltages, and having different amounts of current through relays may be used as training data for training temperature compensation model 120. For example, such training data may include heating and cooling curves for thermostat devices operating at different operating modes with fixed values for base, voltage and current, heating and cooling curves for thermostat devices operating at different bases with fixed values for operating mode, voltage and current, heating and cooling curves for thermostat devices operating at different voltages with fixed values for base, operating mode, and current, and heating and cooling curves for thermostat devices with different amounts of current with fixed values for base, voltage and operating mode.

Figure 11:
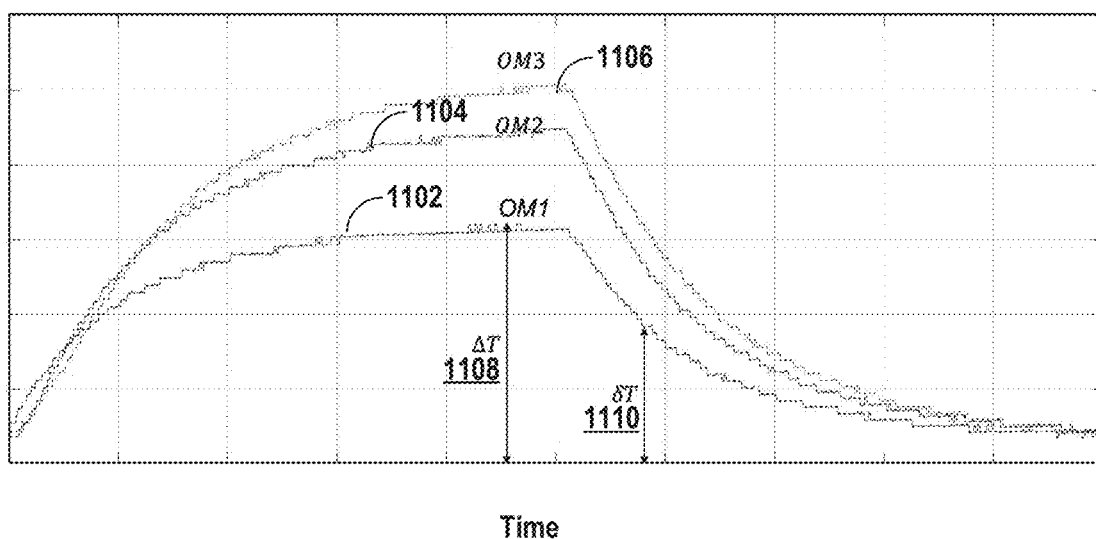
FIG. 11 is a time graph illustrating example heating and cooling curves used as training data to train an example temperature compensation model according to one or more aspects of the present disclosure.

FIG. 11 is a time graph illustrating example heating and cooling curves used as training data to train an example temperature compensation model according to one or more aspects of the present disclosure. As shown in FIG. 11, characteristic curve 1102 for operating mode 1 (OM1) used as training data for temperature compensation model 120 may include both a heating curve and a cooling curve, where the heating curve may have a heating dynamic factor ΔT 1108 and where the cooling curve may have a cooling dynamic factor δT 1110. Characteristic curves 1104 and 1106 for operating modes 2 (OM2) and 3 (OM3) are also shown.

An example of the training data corresponding to the heating curves for OM1, OM2, and OM3 that are used to train temperature compensation model 120 is as follows:

| Operating Mode | Counter | Target ΔT |
| --- | --- | --- |
| 1 | 1 | 0.1 |
| 1 | 2 | 0.113 |
| 1 | 3 | 0.15 |
| 1 | ... | ... |
| 1 | 999 | 1.571 |
| 1 | 1000 | 1.571 |
| 2 | 1 | 0.183 |
| 2 | 2 | 0.20 |
| 2 | 3 | 0.22 |
| 2 | ... | ... |
| 2 | 999 | 2.234 |
| 2 | 1000 | 2.234 |
| 3 | 1 | 0.211 |
| 3 | 2 | 0.220 |
| 3 | 3 | 0.25 |
| 3 | ... | ... |
| 3 | 999 | 2.484 |
| 3 | 1000 | 2.531 |

As can be seen, if the values for base, voltage and current are fixed for thermostat device 102, the training data for heating curves for thermostat 102 operating at different operating modes may specify sets of values that include the operating mode, the counter value that corresponds to the time, and the resulting target heating dynamic factor ΔT. Thus, given the training data, load recognition model 120 may perform machine learning to determine an algorithm that, for an operating mode and a counter value, results in a given target heating dynamic factor ΔT.

An example of the training data corresponding to the cooling curves for OM1, OM2, and OM3 that are used to train load recognition model 120 is as follows:

| Operating Mode | Counter | Target δT |
| --- | --- | --- |
| 1 | 1 | 1.571 |
| 1 | 2 | 1.571 |
| 1 | 3 | 1.571 |
| 1 | ... | ... |
| 1 | 999 | 0.183 |
| 1 | 1000 | 0.173 |
| 2 | 1 | 2.244 |
| 2 | 2 | 2.244 |
| 2 | 3 | 2.244 |
| 2 | ... | ... |
| 2 | 999 | 0.221 |
| 2 | 1000 | 0.221 |
| 3 | 1 | 2.531 |
| 3 | 2 | 2.531 |
| 3 | 3 | 2.531 |
| 3 | ... | ... |
| 3 | 999 | 0.227 |
| 3 | 1000 | 0.227 |

As can be seen, if the values for base, voltage and current are fixed for thermostat device 102, the training data for cooling curves for thermostat 102 operating at different operating modes may specify sets of values that include the operating mode, the counter value that corresponds to the time, and the resulting target cooling dynamic factor T. Thus, given the training data, temperature compensation model 120 may perform machine learning to determine an algorithm that, for an operating mode and a counter value, results in a given target cooling dynamic factor T.

Figure 12:
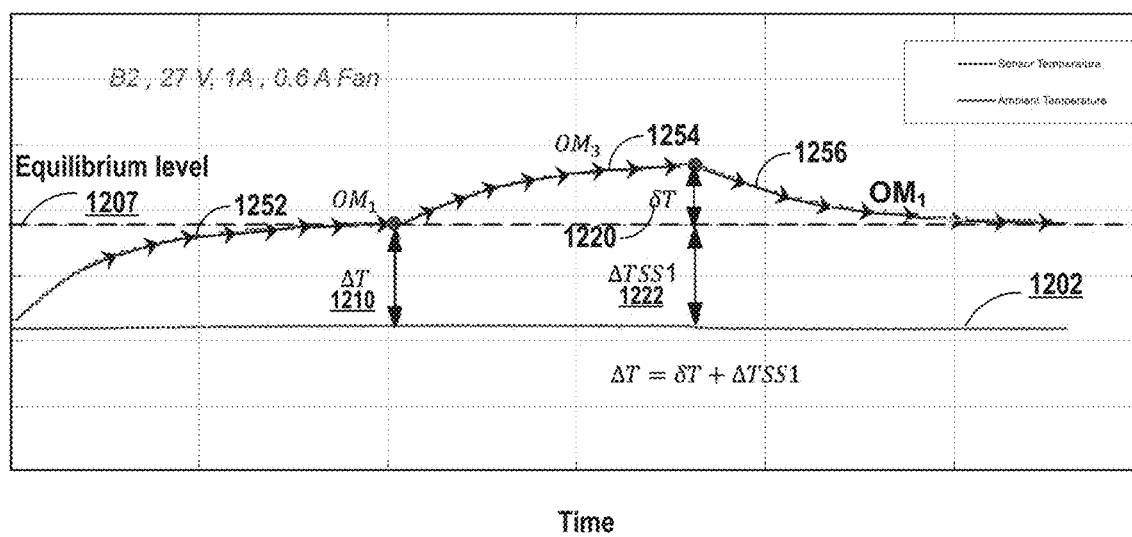
FIG. 12 is a time graph illustrating the behavior of temperature sensed by a temperature sensor through changes in the operating mode of the thermostat device according to one or more aspects of the present disclosure.

FIG. 12 is a time graph illustrating the behavior of temperature sensed by a temperature sensor through changes in the operating mode of the thermostat device according to one or more aspects of the present disclosure. Data regarding such behavior of the sensed temperature through changes in operating modes of the thermostat may also be used as training data to train load recognition model 120.

As shown in FIG. 12, thermostat device 102 may change from operating mode 1 (OM1) to operating mode 3 (OM3) and then back from OM3 to OM1. When thermostat device 102 initially operates at OM1, the temperature sensed by temperature sensor 132 may travel along heating curve 1252 associated with OM1 as electronic circuit board 150 heats up until heating curve 1252 reaches equilibrium level 1207 associated with OM1. While traveling along heating curve 1252, the difference between the temperature sensed by temperature sensor 132 and the ambient temperature 1202 is heating dynamic factor ΔT 1210.

When thermostat device 102 changes from operating in OM1 to operating in OM3, electronic circuit board 150 may continue to heat up, and the temperature sensed by temperature sensor 132 may switch from traveling along heating curve 1252 associated with OM1 to traveling along heating curve 1254 associated with OM3. Thus, when thermostat device 102 changes from operating in OM3 back to operating in OM1, electronic circuit board 150 may therefore cool down, and the temperature sensed by temperature sensor 132 may switch from traveling along heating curve 1254 associated with OM3 to traveling along cooling curve 1256 associated with OM3 (when the board cools, the travel may always be on the initial operating mode OMi).

The temperature sensed by temperature sensor 132 may travel along cooling curve 1256 until it reaches equilibrium level 1207 associated with OM1 having an associated steady state temperature difference ΔTSS1 1222. As can be seen, the equilibrium level for an operating mode may be associated with a steady state temperature difference, and the equilibrium level for an operating mode may be the equilibrium level for the operating mode regardless of whether the temperature sensed by temperature sensor 132 is traveling along the heating curve or the cooling curve associated with the operating mode. As the temperature sensed by temperature sensor 132 travels along cooling curve 1256 associated with OM3, the difference ΔT between the temperature sensed by temperature sensor 132 may be the cooling dynamic factor δT 1220 and the steady state temperature difference ΔTSS1 1222 for equilibrium level 1207.

Figure 13:
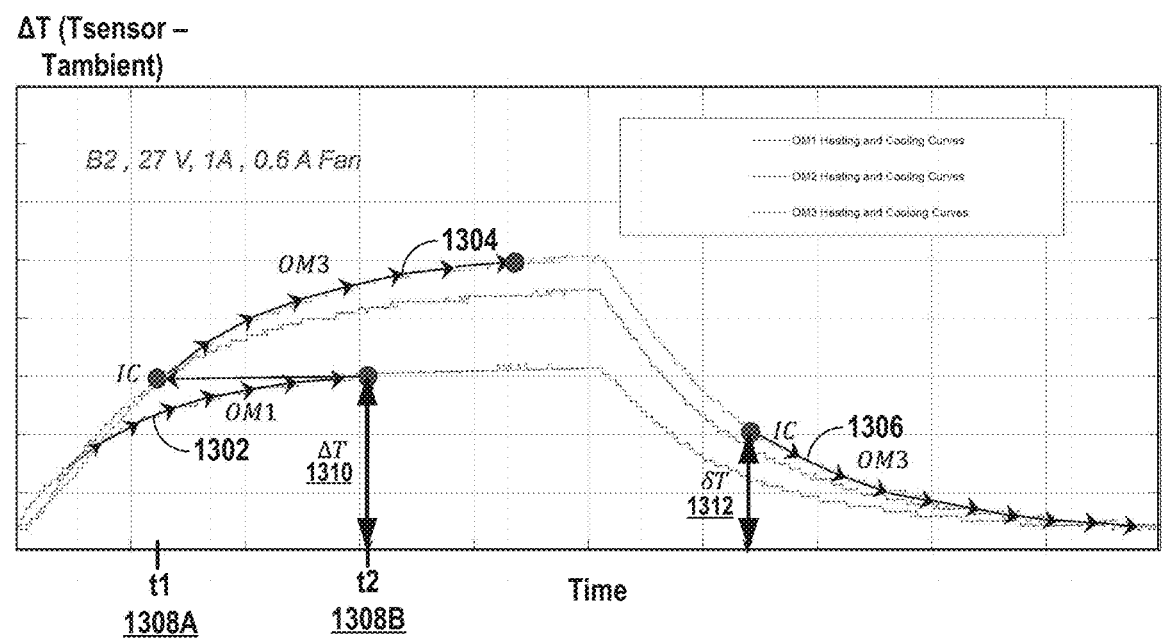
FIG. 13 is a time graph illustrating the behavior of temperature sensed by a temperature sensor through changes in the operating mode of the thermostat device according to one or more aspects of the present disclosure.

FIG. 13 is a time graph illustrating the behavior of temperature sensed by a temperature sensor through changes in the operating mode of the thermostat device according to one or more aspects of the present disclosure. Data regarding such behavior of the sensed temperature through changes in operating modes of the thermostat device may also be used as training data to train temperature compensation model 120.

As shown in FIG. 13, thermostat device 102 may change from operating mode 1 (OM1) to operating mode 3 (OM3). When thermostat device 102 initially operates at OM1, the temperature sensed by temperature sensor 132 may travel along heating curve 1302 associated with OM1 as electronic circuit board 150 heats up. While traveling along heating curve 1302, the difference between the temperature sensed by temperature sensor 132 and the ambient temperature is heating dynamic factor ΔT 1310.

In the example of FIG. 13, when thermostat device 102 changes from operating in OM1 to operating in OM3, electronic circuit board 150 may continue to heat up, and the temperature sensed by temperature sensor 132 may switch from traveling along heating curve 1302 associated with OM1 to traveling along heating curve 1304 associated with OM3. To switch from traveling heating curve 1302 associated with OM1 to traveling along heating curve 1304 associated with OM3, thermostat device 102 may determine the point on heating curve 1304 associated with OM3 that corresponds to the value of heating dynamic factor ΔT 1310 at the time t2 1308B at which thermostat device 102 switches from OM1 to OM3.

Thermostat device 102 may determine that the point on heating curve 1304 associated with OM3 that corresponds to the value of heating dynamic factor ΔT 1310 at the time t2 1308B at which thermostat device 102 switches from OM1 to OM3 is time t1 1308A. Thus, thermostat device 102 may decrement a counter value from a value associated with time t2 1308B to a value associated with time t1 1308A. As can be seen, each time thermostat device 102 switches operating modes, thermostat device 102 may determine the point on the characteristic curve associated with the new operating mode that corresponds to the value of dynamic factor ΔT at the time the operating mode switch occurs, and may decrement a counter value to correspond to the determined point on the characteristic curve associated with the new operating mode. The temperature sensed by temperature sensor 132 may therefore follow heating curve 1304 starting at the determined point (e.g., at time t1 1308A).

In some examples, changing the operating mode of thermostat device 102 to OM3 may cause electronic circuit board 150 to cool. In that case, the temperature sensed by temperature sensor 132 may travel along cooling curve 1306 associated with OM3. As described throughout this disclosure, when traveling along a cooling curve such as cooling curve 1306, thermostat device 102 may determine a cooling dynamic factor δT such as cooling dynamic factor δT 1306 in order to determine the ambient temperature.

As illustrated via the examples of FIGS. 5-13, when an operating mode change occurs for a thermostat device from an initial operating mode to a new operating mode, a new curve, such as a new heating or cooling curve, corresponding to the new operating mode begins a new trajectory. In order to select the new characteristic curve, in response to a change in the operating mode of thermostat device 102, thermostat device 102 may have to determine one or more of: the value of the steady state temperature difference ΔTSS at the equilibrium point for the new characteristic curve, whether electronic circuit board 150 will heat (E=1) or cool (E=2) in response to the change in the operating mode, what is the characteristic curve for the new operating mode when electronic circuit board 150 is heating (E=1) or the initial characteristic curve when electronic circuit board 150 is cooling (E=2), and the point on the new characteristic curve from which to start (i.e., the point on the new characteristic curve that corresponds to the value of ΔT) following the new characteristic curve.

Figure 14:
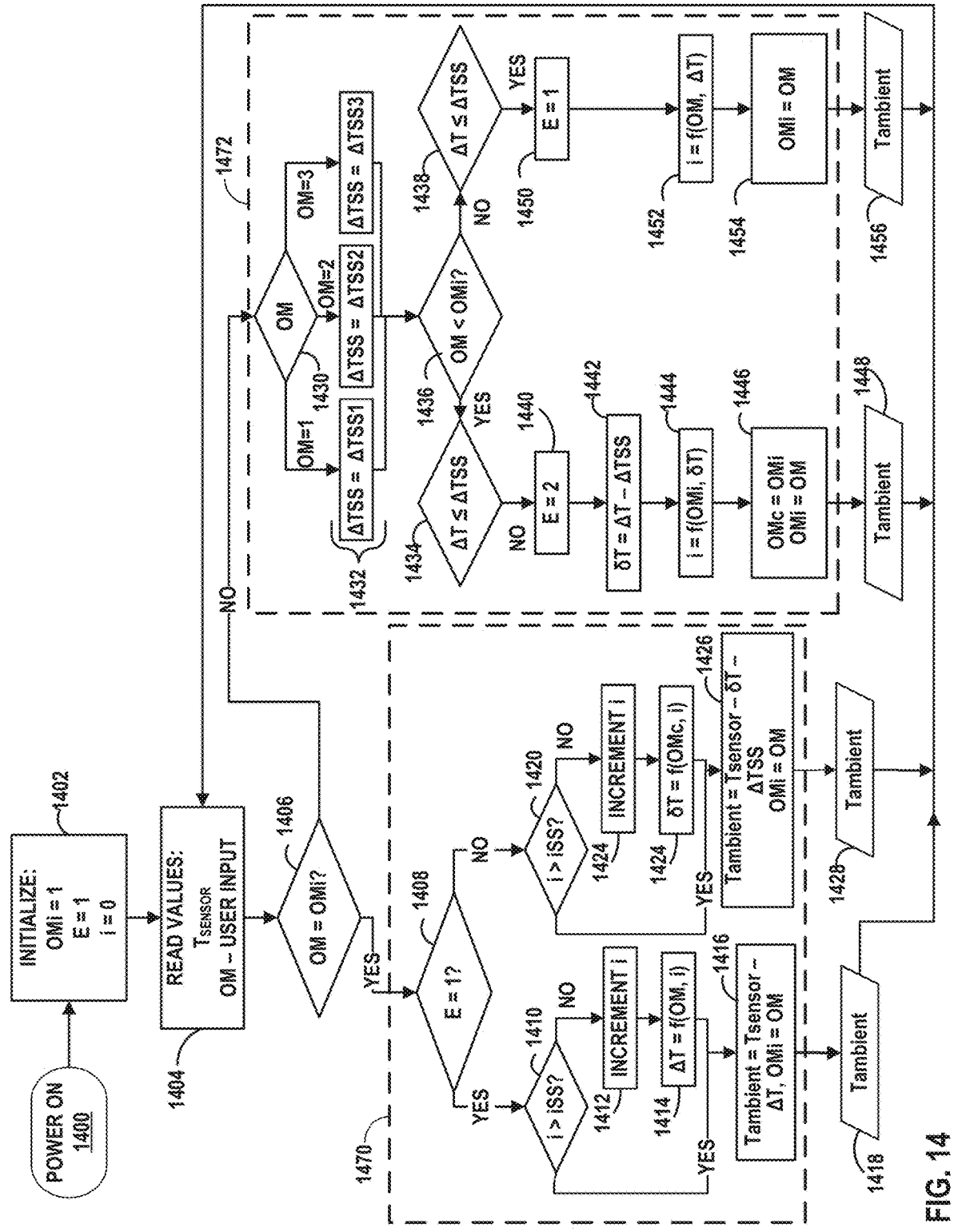
FIG. 14 is a flowchart illustrating example operations of the thermostat device to perform temperature compensation to determine the ambient temperature according to one or more aspects of the present disclosure.

FIG. 14 is a flowchart illustrating example operations of the thermostat device to perform temperature compensation to determine the ambient temperature according to one or more aspects of the present disclosure. The technique illustrated in FIG. 14 may assume that the base and the load level are fixed, and are described with respect to FIGS. 5-13. The techniques illustrated in FIG. 14 may be performed as part of executing temperature compensation model 120 at processing circuitry 104.

As shown in FIG. 14, when power is applied to a thermostat device, such as when thermostat device 102 is powered on (1400), the thermostat device 102 may initialize itself by setting the operating mode (OM) of the thermostat device 102, the indication of whether electronic circuit board 150 is cooling or heating, and the counter value (such as for determining the point of a characteristic curve such as shown in FIG. 13) to default values (1402). For example, the thermostat device 102 may set the OMi to OMi=1 (i.e., setting the operating mode 1), the value E indicative of whether the electronic circuit board 150 is heating or cooling to E=1 (electronic circuit board 150 is heating) and the counter to zero (i=0). The operating mode set by the thermostat device 102 may be referred to as the initial operating mode (OMi).

Processing circuitry 104 of the thermostat device 102 may receive the temperature sensor value Tsensor from the temperature sensor 132 and may check for user input, such as at a user interface 103 of the thermostat device 102, to select the operating mode of the thermostat device 102 (1404). The processing circuitry 104 may determine whether there has been a change in the operating mode of the thermostat device 102 by comparing the initial operating mode OMi to the current operating mode OM of the thermostat device 102 (1406). If the thermostat device 102 did not receive user input to select a different operating mode from the initial operating mode, the comparison of OMi to OM may indicate no changes in operating mode.

Processing circuitry 104 may use the determination of whether there has been a change in the operating mode of the thermostat device 102 to determine whether processing circuitry 104 proceeds to perform the techniques of temperature compensation block 1470 or initial conditions block 1472. If processing circuitry 104 determines that there has not been a change in the operating mode, processing circuitry 104 may proceed to perform the techniques of temperature compensation block 1470 to determine the ambient temperature. On the other hand, if processing circuitry 104 determines that there has been a change in the operating mode, processing circuitry 104 may proceed to perform the techniques of initial conditions block 1472 to set various initial conditions for the new operating mode, as described in detail below.

If the processing circuitry 104 determines that the operating mode of the thermostat device 102 did not change, such that processing circuitry 104 proceeds to perform the techniques of temperature compensation block 1470, the processing circuitry 104 may proceed to determine whether the electronic circuit board 150 is heating or cooling (1408). As discussed in this disclosure, the value E is equal to 2 (E=2) if the electronic circuit board 150 is cooling, and the value E is equal to 1 (E=1) if the electronic circuit board 150 is heating. If thermostat device 102 was just powered on, the temperature of the electronic circuit board 150 may be increasing, and therefore E=1.

In response to determining that the electronic circuit board 150 is heating, processing circuitry 104 may determine whether the temperature sensor value Tsensor measured by temperature sensor 132 of thermostat device 102 has reached a steady state temperature (also referred to as the characteristic curve reaching an equilibrium level) for the operating mode in which thermostat device 102 operates by determining whether the counter value i is larger than a steady state counter value iSS (1410). In the example in which the thermostat is not yet at steady state for the operating mode, the counter value i may be less than the steady state counter value iSS for the operating mode, therefore i<iSS (NO branch of 1410). The processing circuitry 104 may increment the counter i (1412), such as incrementing the counter value i by 4 (e.g., i=i+4) and determine the heating dynamic factor $\Delta T$ as a function of the operating mode and the elapsed time counted by counter value i, e.g. $\Delta T=f(OM, i)$ (1414). The processing circuitry 104 may determine the function $f(OM, i)$ for determining the heating dynamic factor $\Delta T$ using a neural network model trained using data illustrated in FIGS. 5-13, as described throughout this disclosure.

In the example in which the temperature of electronic circuit board 150 has reached steady state for the operating mode, then i>iSS is true. At the steady state for the operating mode, the difference between the Tsensor and Tambient is the steady state temperature difference $\Delta T_{SS}$ for the operating mode. Processing circuitry 104 may therefore, when the temperature of electronic circuit board 150 has reached the steady state for the operating mode, set the dynamic factor $\Delta T$ to the steady state temperature difference $\Delta T_{SS}$ for the operating mode, i.e. $\Delta T=\Delta T_{SS}$.

Once the processing circuitry 104 has determined the dynamic factor, $\Delta T$, the processing circuitry 104 may estimate the ambient room temperature for the room in which the thermostat device 102 is placed and set the initial operating mode equal to the actual operating mode (1416). That is, the value for initial operating mode OMi is set to the value of the actual operation mode OM for the purposes of determining, at a later point, the operating mode of the thermostat device 102 has changed.

The processing circuitry 104 estimates the ambient temperature Tambient as Tambient=Tsensor−$\Delta T$, and may update the ambient temperature value to Tambient (1418). Thermostat device 102 may, for example, display the ambient temperature on the user interface and determine whether or not the operating mode should change based on a comparison of Tambient to a temperature setpoint. As described above in relation to FIG. 1, the temperature setpoint may be entered by the user at the user interface or may be automatically changed according to a programmed schedule stored in the memory of the thermostat.

Referring back to block 1408, if the processing circuitry 104 determines that the electronic circuit board 150 is cooling (E=2), processing circuitry 104 may determine whether the temperature sensor value Tsensor measured by temperature sensor 132 of thermostat device 102 operating in an operating mode has reached a steady state temperature for the operating mode by determining whether the counter value i is larger than a steady state counter value iSS (1420). In the example in which the thermostat device 102 is not yet at steady state for the operating mode, the counter value i may be less than the steady state counter value iSS for the operating mode, therefore i<iSS (NO branch of 1420). The processing circuitry 104 may increment the counter i (1422), such as incrementing the counter value i by 4 (e.g., i=i+4) and determine the cooling dynamic factor $\delta T$ as a function of the cooling operating mode OMc and the elapsed time counted by counter value i, e.g. $\delta T=f(OMc, i)$ (1424). The processing circuitry 104 may determine the function f(OMc, i) for determining the cooling dynamic factor $\delta T$ using a neural network model trained using data illustrated in FIGS. 5-13, as described throughout this disclosure.

In the example in which the temperature of electronic circuit board 150 has reached steady state for the operating mode, then i>iSS is true. At the steady state for the operating mode, the difference between the Tsensor and Tambient is the steady state temperature difference $\Delta T_{SS}$ for the operating mode. Processing circuitry 104 may therefore, when the thermostat device 102 has reached the steady state for the operating mode, set the cooling dynamic factor $\delta T$ to zero.

Once the processing circuitry 104 has determined the cooling dynamic factor, $\delta T$, the processing circuitry 104 may estimate the ambient room temperature for the room in which the thermostat device 102 is placed and set the initial operating mode equal to the actual operating mode (1426). That is, the value for initial operating mode OMi is set to the value of the actual operation mode OM for the purposes of determining, at a later point, the operating mode of the thermostat device 102 has changed.

The processing circuitry 104 estimates the ambient temperature Tambient as Tambient=Tsensor−$\delta T$−$\Delta T_{SS}$, and may update the ambient temperature value to Tambient (1428). Thermostat device 102 may, for example, display the ambient temperature on the user interface 103 and determine whether or not the operating mode should change based on a comparison of Tambient to a temperature setpoint. As described above in relation to FIG. 1, the temperature setpoint may be entered by the user at the user interface 103 or may be automatically changed according to a programmed schedule stored in the memory 105 of the thermostat device 102.

In response to determining and displaying the ambient temperature, such as at blocks 1416, 1418, 1426, and 1428, processing circuitry 104 may return to block 1404 where the processing circuitry 104 may read the sensor temperature Tsensor and check the operating mode of the thermostat device 102. While the operating mode of the thermostat device 102 remains unchanged, processing circuitry 104 may perform the techniques of temperature compensation block 1470. For example, as the counter value i increases, while the electronic circuit board 150 is heating, the heating dynamic factor $\Delta T$ for the operating mode may continue to track along the characteristic heating curve and eventually remains constant at a steady state temperature difference $\Delta T_{SS}$. Similarly, as the counter value i increases, while the electronic circuit board 150 is cooling, the cooling dynamic factor $\delta T$ for the operating mode may continue to track along the characteristic cooling curve and may eventually decrease to zero.

At block 1406, when the operating mode of the thermostat device 102 changes, processing circuitry 104 may proceed to perform the techniques for initial conditions block 1472. Processing circuitry 104 may therefore determine the current operating mode of the thermostat device 102 (1430). Because each operating mode may be associated with a different steady state temperature difference $\Delta T_{SS}$, processing circuitry 104 may determine the current operating mode of the thermostat device 102 in order to determine the correct steady state temperature difference associated with the current operating mode.

The processing circuitry 104 may assign the steady state temperature difference $\Delta T_{SS}$ for the equilibrium point of the current operating mode (1432). For example, if the current operating mode is 3 (OM=3), processing circuitry 104 may determine the steady state temperature difference value $\Delta T_{SS}$ to be $\Delta T_{SS3}$. In other examples, if the current operating mode is 2 (OM=2), the processing circuitry 104 may determine the steady state temperature difference value $\Delta T_{SS}$ as $\Delta T_{SS2}$. Similarly, if the current operating mode is 1 (OM=1), the processing circuitry 104 may determine the steady state temperature difference value $\Delta T_{SS}$ as $\Delta T_{SS1}$.

The processing circuitry 104 determines whether the current operating mode (OM) is less than the initial operating mode (OMi), where the initial operating mode is the previous operating mode before the change in the operating mode (1436). The processing circuitry 104 determines whether OM is less than OMi in order to determine whether the electronic circuit board 150 will heat up or cool in response to the change in operating mode from OMi to OM. For example, if OM is larger than OMi, then the electronic circuit board 150 may usually, but not always, be heating up. Similarly, if OM is less than OMi, then the electronic circuit board 150 may usually, but not always, be cooling down.

For example, if the initial operating mode is 1 (OM=1), the current operating mode cannot be less than 1 if there has been an operating mode change away from operating mode 1, so that the condition of the current operating mode being less than the initial operating mode cannot be met. In another example, if the initial operating mode is 2 (OM=2), the current operating mode is less than the initial operating mode if the current operating mode is 1. In another example, if the initial operating mode is 3 (OM=3), the current operating mode is less than the initial operating mode if the current operating mode is 1 or if the current operating mode is 2.

As discussed above, in the case of OM being less than OMi, the electronic circuit board 150 may usually, but not always be cooling down. The processing circuitry 104 may determine whether the electronic circuit board 150 is actually cooling down by determining whether the current value of the dynamic factor $\Delta T$ is less than or equal to the steady state temperature difference value $\Delta T_{SS}$ for the current OM (1434). Processing circuitry 104 may have computed the current value of the dynamic factor $\Delta T$ at, for example, block 1414. If the dynamic factor $\Delta T$ is less than or equal to the steady state temperature difference value $\Delta T_{SS}$ for the OM, it may indicate that the electronic circuit board 150 is heating. In the case where the dynamic factor $\Delta T$ is larger than the steady state temperature difference value $\Delta T_{SS}$ for the OM, the processing circuitry 104 may confirm that the temperature of the electronic circuit board 150 is decreasing, also denoted as E=2 (1440).

In response to determining that the temperature of the electronic circuit board 150 is decreasing, the processing circuitry 104 may therefore determines the cooling dynamic factor $\delta T$ by subtracting the dynamic factor $\Delta T$ by the steady state temperature difference value $\Delta T_{SS}$, such as $\delta T = \Delta T - \Delta TSS$ (1442). The processing circuitry 104 may use the determined cooling dynamic factor $\delta T$ to determine the counter value i for cooling as a function of OM and $\delta T$, such as i=f(OM, $\delta T$) (1444). As discussed throughout this disclosure, when the operating mode of the thermostat changes, the counter value i may change to correspond to the time at which the cooling curve for the operating mode would have reached the point where it is associated with the determined cooling dynamic factor $\delta T$, starting from an initial time corresponding to the counter value i being zero. In other words, the processing circuitry 104 may determine the current point on the cooling curve for the operating mode based on the determined cooling dynamic factor T. The processing circuitry 104 may determine the function f(OM, $\delta T$) for determining the counter value i for cooling using a neural network function or model trained using data illustrated in FIGS. 5-13, as described throughout this disclosure.

In response to determining counter value i, processing circuitry 104 may determine the operating mode when cooling (OMc) to the initial operating mode OMi, such that OMc=OMi, and may set the value of OMi to be the current, actual operating mode OM (1446). The processing circuitry 104 displays the previously estimated Tambient (1448) as described above and may display Tambient on the user interface 103 of the thermostat device 102. The previously estimated ambient temperature is the temperature estimated when block 1406 previously determined in an earlier cycle that there was no operating mode change.

Similarly, at block 1436, in the case of OM being greater than OMi, the electronic circuit board 150 may usually, but not always be heating up. The processing circuitry 104 may determine whether the electronic circuit board 150 is actually heating up by determining whether the current value of the dynamic factor $\Delta T$ is less than or equal to the steady state temperature difference value $\Delta T_{SS}$ for the OM (1438). Processing circuitry 104 may have computed the current value of the dynamic factor $\Delta T$ at, for example, block 1416. If the dynamic factor $\Delta T$ is less than or equal to the steady state temperature difference value $\Delta T_{SS}$ for the OM, it may indicate that the electronic circuit board 150 is heating, and the processing circuitry 104 may confirm that the temperature of the electronic circuit board 150 is heating, also denoted as E=1 (1450).

Processing circuitry 104 may therefore proceed to determine the value of the counter, i, to begin the characteristic curve of the operating mode as a function of OM and dynamic factor $\Delta T$, e.g. i=f(OM, $\Delta T$) (1452). As discussed throughout this disclosure, when the operating mode of the thermostat changes, the counter value i may change to correspond to the time at which the heating curve for the operating mode would have reached the point where it is associated with the determined dynamic factor $\Delta T$, starting from an initial time corresponding to the counter value i being zero. In other words, the processing circuitry 104 may determine the current point on the heating curve for the operating mode based on the determined dynamic factor $\Delta T$. The processing circuitry 104 may determine the function f(OM, $\Delta T$) for determining the counter value i for cooling using a neural network algorithm trained using data illustrated in FIGS. 9-17, as described above. Processing circuitry 104 may set the initial operating mode equal to the actual operating mode, such as OMi=OM (1454) and display the previously estimated ambient room temperature (1456) for the room in which the thermostat device 102 is placed.

The processing circuitry 104 continues to execute the algorithm on each cycle by reading the temperature sensor 132 and checking for changes in operating mode (1406). In this way, the thermostat device 102 may be able to continually determine the ambient temperature through time and through different changes in the operating mode of the thermostat device 102.

In the temperature compensation algorithm, such as illustrated in the example of FIG. 14, stability of the algorithm and temperature control is achieved when there is continuity on the value of dynamic factor ΔT regardless of changes to the operating mode or base of the thermostat device 102. As described above, in response to a change in operating mode of thermostat device 102, the temperature sensed by temperature sensor 132 may track the heating or cooling curve of the new operating mode starting from the point on the curve that correspond to the value of dynamic factor ΔT at the time where the change in operating mode occurs.

The number of combinations of operating mode changes can be expressed as $$C_{m,n} = \frac{m!}{n!(m-n)},$$

where m is the number of operating modes (e.g., 3) and where n is the number of operating modes making up an operating mode change (e.g., 2). As such, the m=3 and n=2, $$C_{m,n} = \frac{3!}{2!(3-2)} = 3.$$

Thus, given 3 operating modes, there may be 3 different ways to select combinations of 2 operating modes (e.g., operating mode 1 and operating mode 2, operating mode 1 and operating mode 3, and operating mode 2 and operating mode 3).

In the case of three operating modes, electronic circuit board 150 may generally heat up in response to the following operating mode changes: operating mode 1 to operating mode 2 (case H), operating mode 1 to operating mode 3 (case I), and operating mode 2 to operating mode 3 (case J). However, in some cases, electronics circuit board 150 may cool when changing from operating mode 1 to operating mode 2 (case K).

In the case of three operating modes, electronic circuit board 150 may generally cool down in response to the following operating mode changes: operating mode 3 to operating mode 1 (case E), operating mode 2 to operating mode 1 (case F and case G), and operating mode 3 to operating mode 2 (case D). However, in some cases, electronics circuit board 150 may heat up when changing from operating mode 2 to operating mode 1 (case A), from operating mode 3 to operating mode 1 (case B), and from operating mode 3 to operating mode 2 (case C).

Figure 15:
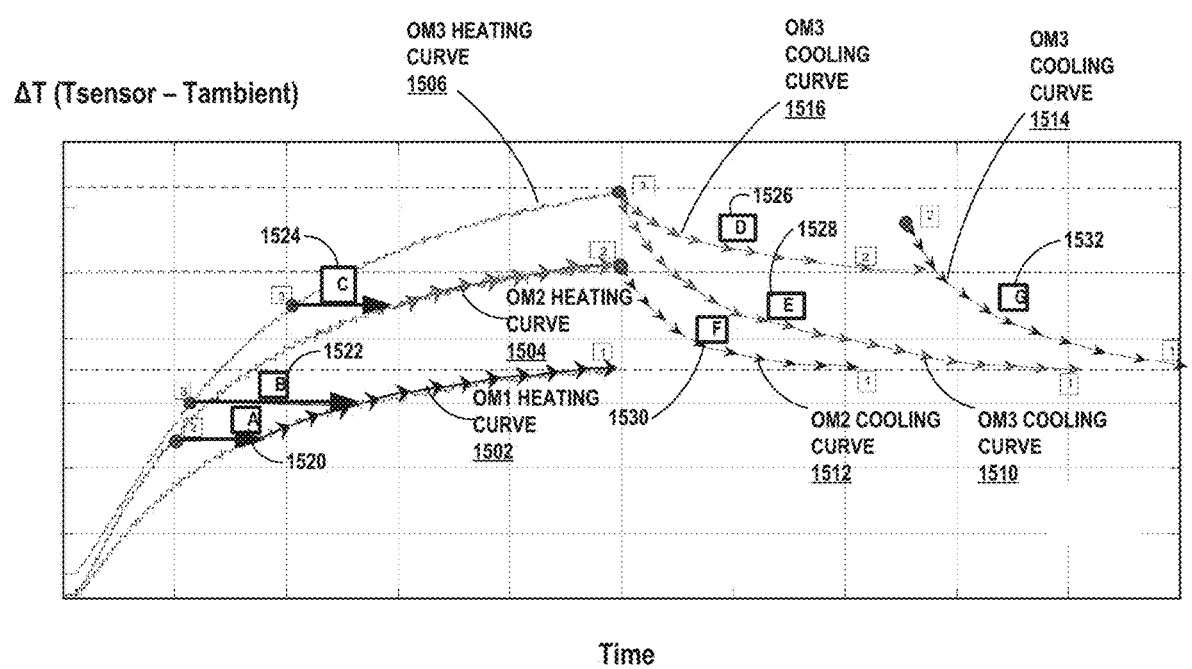
FIG. 15 is a time graph illustrating example techniques for determining whether an electronic circuit board of the thermostat device heats or cools in response to a change in the operating mode of the electronic device according to one or more aspects of the present disclosure.

FIG. 15 is a time graph illustrating example techniques for determining whether an electronic circuit board of the thermostat device heats or cools in response to a change in the operating mode of the electronic device according to one or more aspects of the present disclosure. As shown in FIG. 15, in case A 1520, where thermostat device 102 changes operating modes from operating mode 2 (OM2) to operation mode 1 (OM1), the change in operating mode may cause the temperature sensed by temperature sensor 132 to switch from following OM2 heating curve 1504 to following OM1 heating curve 1502. As such, in case A 1520, the change in operating mode from OM2 to OM 1 may cause electronic circuit board 150 to heat up.

In case B 1522, where thermostat device 102 changes operating modes from operating mode 3 (OM3) to OM1, the change in operating mode may cause the temperature sensed by temperature sensor 132 to switch from following OM3 heating curve 1506 to following OM1 heating curve 1502. As such, in case B 1522, the change in operating mode from OM3 to OM 1 may cause electronic circuit board 150 to heat up.

In case C 1524, where thermostat device 102 changes operating modes from OM3 to OM2, the change in operating mode may cause the temperature sensed by temperature sensor 132 to switch from following OM3 heating curve 1506 to following OM2 heating curve 1504. As such, in case C 1524, the change in operating mode from OM3 to OM 2 may cause electronic circuit board 150 to heat up.

In case D 1526, where thermostat device 102 changes operating modes from OM3 to OM2, the change in operating mode may cause the temperature sensed by temperature sensor 132 to switch from following OM3 heating curve 1506 to following OM3 cooling curve 1516. As such, in case D 1526, the change in operating mode from OM3 to OM2 may cause electronic circuit board 150 to cool down.

In case E 1528, where thermostat device 102 changes operating modes from OM3 to OM1, the change in operating mode may cause the temperature sensed by temperature sensor 132 to switch from following OM3 heating curve 1506 to following OM3 cooling curve 1510. As such, in case E 1528, the change in operating mode from OM3 to OM 1 may cause electronic circuit board 150 to cool down.

In case F 1530, where thermostat device 102 changes operating modes from OM2 to OM1, the change in operating mode may cause the temperature sensed by temperature sensor 132 to switch from following OM2 heating curve 1504 to following OM2 cooling curve 1512. As such, in case F 1530, the change in operating mode from OM2 to OM 1 may cause electronic circuit board 150 to cool down. Similarly, in case G 1532, where thermostat device 102 changes operating modes from OM2 to OM1, the change in operating mode may cause the temperature sensed by temperature sensor 132 to follow OM3 cooling curve 1514. As such, in case G 1532, the change in operating mode from OM2 to OM 1 may cause electronic circuit board 150 to cool down.

Figure 16:
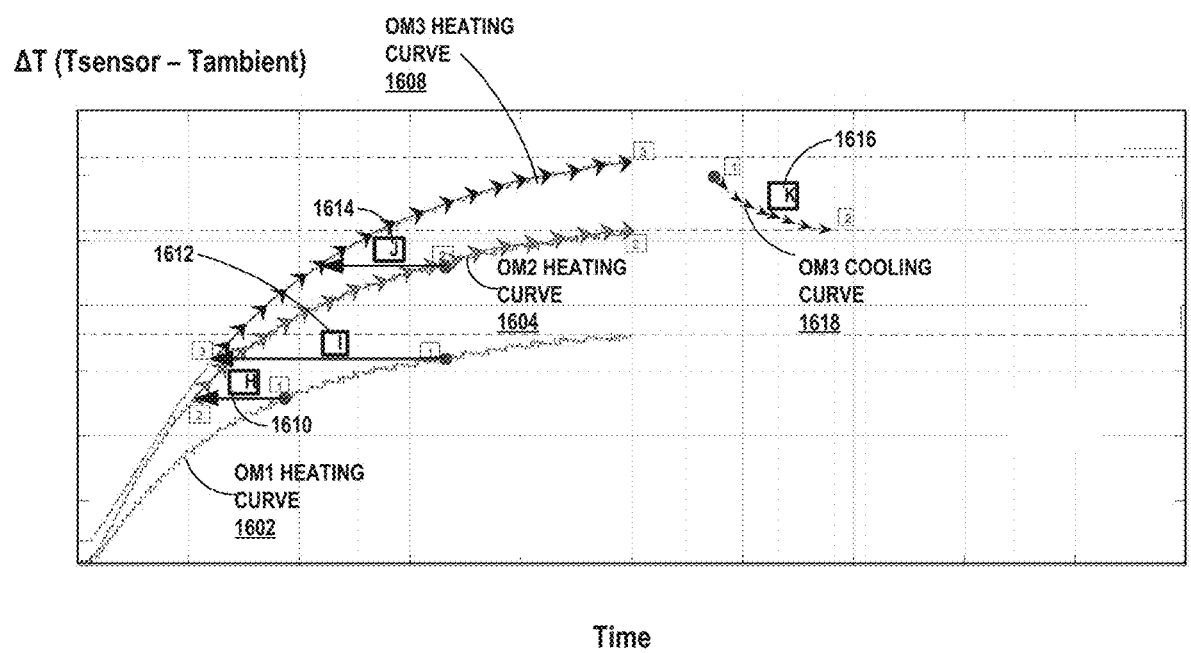
FIG. 16 is a time graph illustrating additional example techniques for determining whether an electronic circuit board of the thermostat device heats or cools in response to a change in the operating mode of the electronic circuit board according to one or more aspects of the present disclosure.

FIG. 16 is a time graph illustrating additional example techniques for determining whether an electronic circuit board of the thermostat device heats or cools in response to a change in the operating mode of the electronic circuit board according to one or more aspects of the present disclosure. As shown in FIG. 16, in case H 1610, where thermostat device 102 changes operating modes from OM1 to OM2, the change in operating mode may cause the temperature sensed by temperature sensor 132 to switch from following OM1 heating curve 1602 to following OM2 heating curve 1604. As such, in case H 1610, the change in operating mode from OM1 to OM2 may cause electronic circuit board 150 to heat up.

In case I 1612, where thermostat device 102 changes operating modes from OM1 to OM3, the change in operating mode may cause the temperature sensed by temperature sensor 132 to switch from following OM1 heating curve 1602 to following OM3 heating curve 1608. As such, in case I 1612, the change in operating mode from OM1 to OM 3 may cause electronic circuit board 150 to heat up.

In case J 1614, where thermostat device 102 changes operating modes from OM2 to OM3, the change in operating mode may cause the temperature sensed by temperature sensor 132 to switch from following OM2 heating curve 1604 to following OM3 heating curve 1608. As such, in case J 1614, the change in operating mode from OM2 to OM 3 may cause electronic circuit board 150 to heat up.

In some examples, in case K 1616, where thermostat device 102 changes operating modes from OM1 to OM2, the change in operating mode may cause the temperature sensed by temperature sensor 132 to switch to following OM3 heating cooling curve 1618. As such, in case K 1616, the change in operating mode from OM1 to OM2 may cause electronic circuit board 150 to cool down.

Figure 17A:
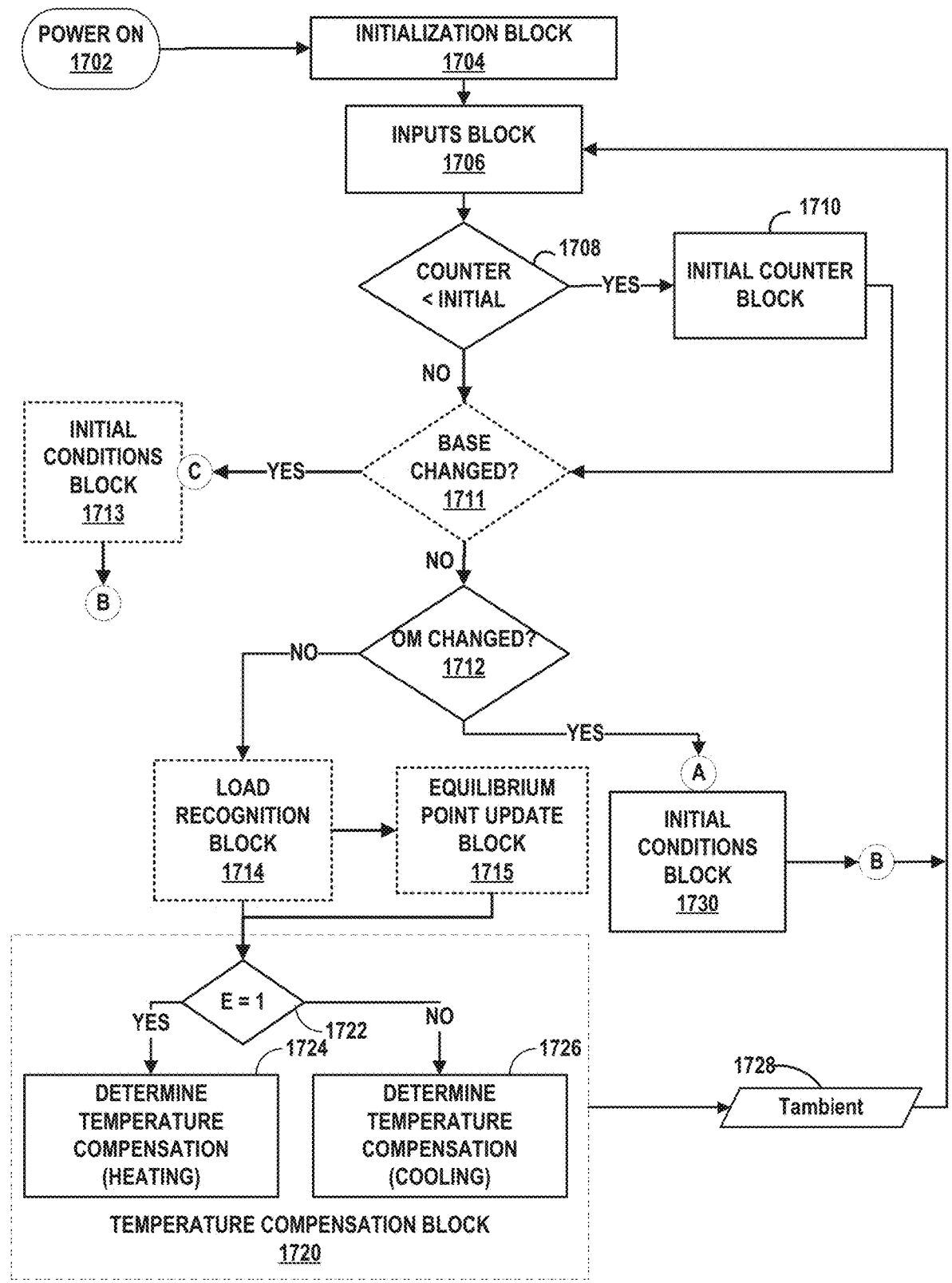
FIGS. 17A-17C are flowcharts illustrating an example ambient temperature estimation algorithm performed by the thermostat device according to one or more aspects of the present disclosure.
Figure 17B:
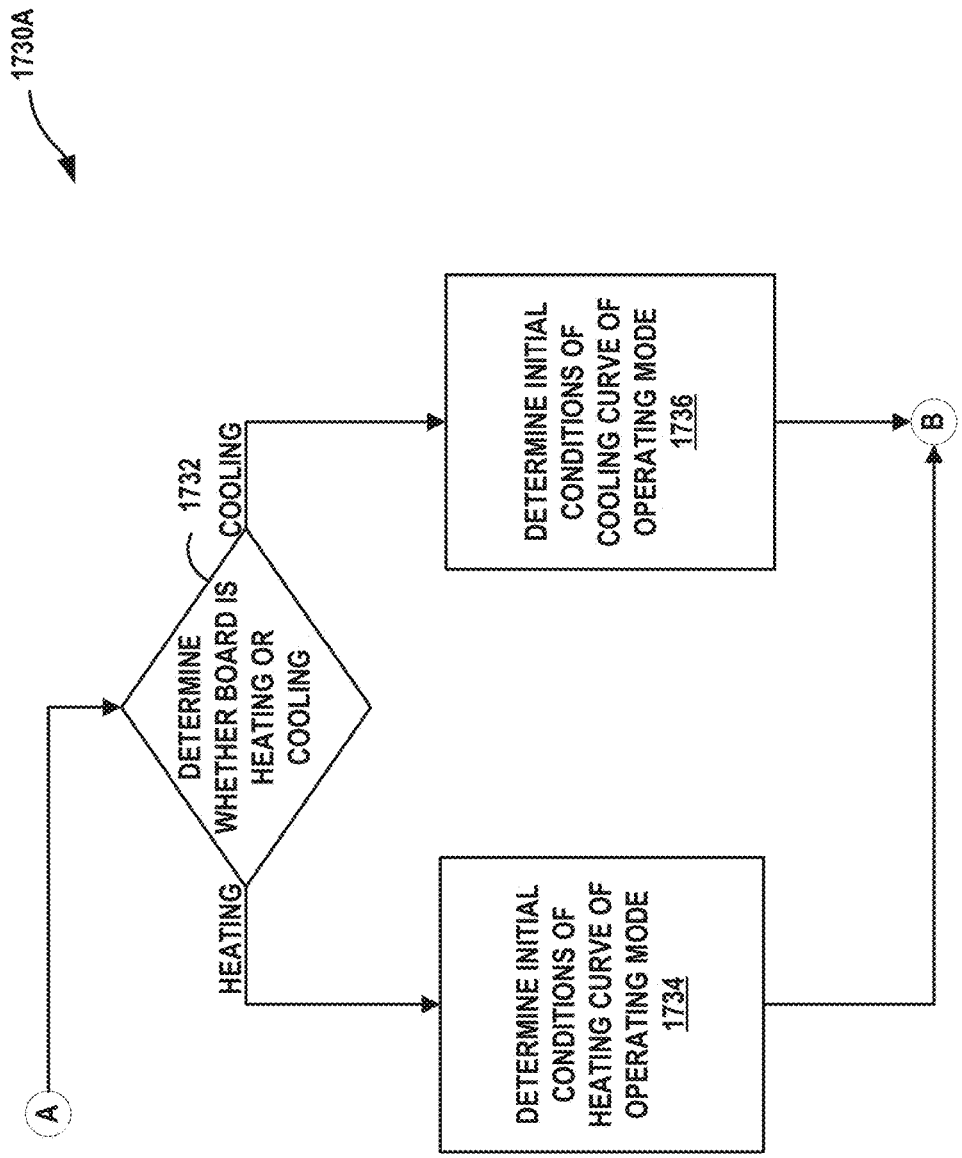
Figure 17C:
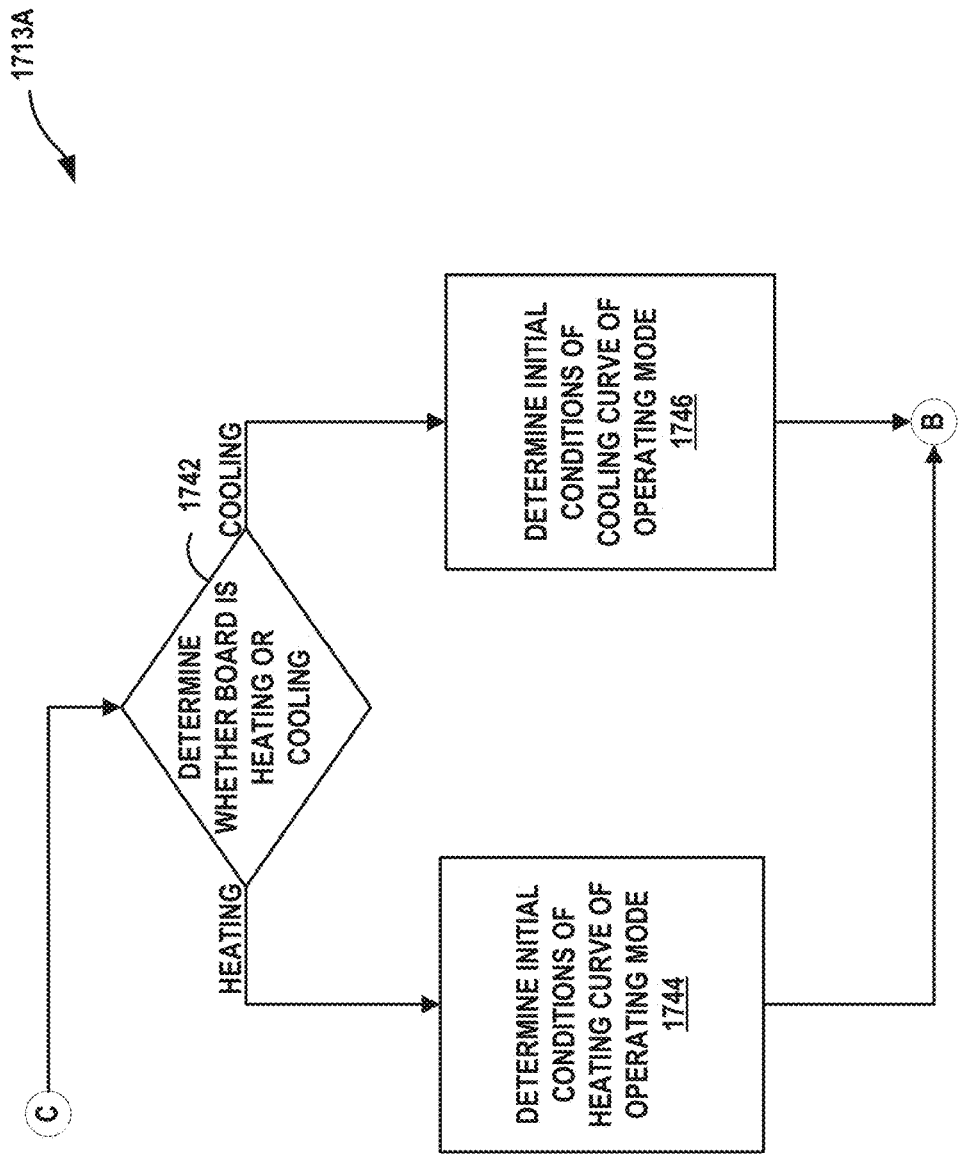

FIGS. 17A-17C are flowcharts illustrating an example ambient temperature estimation algorithm performed by the thermostat device according to one or more aspects of the present disclosure. The flowcharts of FIGS. 17A-17C provide an overview of the algorithm of temperature compensation model 120 executed by the processing circuitry 104 of the thermostat device 102 of FIG. 1. The blocks of FIGS. 17A-17C may include the functions described above in relation to FIG. 14, as well as additional functions and steps not shown to simplify the description.

As shown in FIG. 17A, when a low-voltage thermostat, such as thermostat device 102 described above in relation to FIG. 1A, is powered on (1702), the processing circuitry 104 for thermostat device 102 may execute an initialization block (1704). Some steps of initialization block 1704 may include steps of initialization block 1402, described above in relation to FIG. 14. For example, the processing circuitry 104 may set the initial operating mode to OM1, assume the electronic circuit board 150 will be heating (E=1) instead of cooling, and set the counter value to zero (i=0). Initialization block 1704 may also include additional initialization steps. For example, processing circuitry 104 may also set a value for the base that is indicative of whether the base is A/C power, battery power, or if the backlight 107 of the display 112 is on.

Whenever there is an electric power interruption, and the power is recovered, e.g. power ON 1702, thermostat device 102 may start up and initialize to the OFF condition (OM1). If the interruption has been just some a short period, such as a few minutes long, the internal temperatures of thermostat device 102 may still be relatively high. Therefore, in some examples, the processing circuitry 104 may execute instructions to leave thermostat device 102 for a specified period, for example, three minutes, five minutes, or some similar period, every time that thermostat device 102 is powered on. The specified period may allow the processing circuitry 104 to determine whether thermostat device 102 is initially hot internally and the processing circuitry 104 may compensate the temperature accordingly.

After initialization, the processing circuitry 104 may receive inputs from the one or more temperatures sensors, such as temperature sensor 130 and temperature sensor 132 described above in relation to FIG. 17A (1706). The processing circuitry 104 may receive inputs from the user interface 103, such as operating mode, base, temperature setpoint, schedule programming and other inputs. Inputs block 1706 is an example of block 1404 described above in relation to FIG. 14.

In the example of FIG. 17A, the processing circuitry 104 may check whether the counter value is less than an initial value (1708). The processing circuitry 104 may execute certain initial counter functions (1710) when the counter has a low initial value (YES branch of 1708). For example, the processing circuitry 104 may execute the power interruption functions described above, functions related to the electronic circuit board 150 warming up for the first time, or similar functions. Specifically, after thermostat device 102 is powered on, processing circuitry 104 may execute initial counter functions that increases the value of the counter to begin performing temperature compensation when the board is warmer than the ambient temperature, which may be the case when a brief power interruption occurs. If processing circuitry 104 increases the initial counter value, then then processing circuitry 104 may not perform such initial counter functions.

When the counter value is greater than an initial value (NO branch of 1708) or after performing initial counter functions in block 1710, processing circuitry 104 may determine whether the base has changed (1711). If the base has changed (YES branch of 1711), processing circuitry 104 may set some initial conditions for the new base (1713), as described further in FIG. 17C. Some examples of initial conditions may include setting the expected steady state temperature, $\Delta T_{SS}$ and calculating the counter.

If the base has not changed (NO branch of 1711), the processing circuitry 104 may compare the actual operating mode, e.g. selected by the user, to the initial operating mode (OMi) to determine whether the operating mode has changed (1712). When the operating mode has changed (YES branch of 1712) the processing circuitry 104 may set some initial conditions for the new operating mode (1730), as described further in FIG. 17B. After setting the initial conditions, the processing circuitry 104 starts a new cycle by checking the inputs block 1706 as described above.

In the example in which there is no change to the operating mode (NO branch of 1712), the processing circuitry 104 may execute load recognition block 1714. As described later, processing circuitry 104 may be able to estimate the current through the relays 106, 108, and 110 and the operating voltage of thermostat device 102 based at least in part on differences between the temperatures sensed by temperature sensor 130 and temperature sensor 132. Because heating and cooling curves of operation modes may be different at different current levels and voltage levels, processing circuitry 104 may update the equilibrium levels for the heating and/or cooling curves of operation modes and their associated steady state temperature difference $\Delta T_{SS}$ based at least in part on the determined current and voltage levels (1715).

Load recognition block 1714 and equilibrium update block 1715 were omitted from FIG. 14 to simplify the explanation of the algorithm in FIG. 14. However, the functions of load recognition block 1714 and equilibrium update block 1715 may be included in the example of FIG. 14. In some examples where thermostat device 102 uses one or more voltage measurement and/or current measurement devices (e.g., voltage measurement circuitry 109) to measure the voltage and current, load recognition block 1714 and equilibrium update block 1715 may be omitted from FIG. 14 and FIG. 17A. In this case, thermostat device 102 may include only a single temperature sensor—temperature sensor 132 rather than including two temperature sensors—temperature sensor 130 and temperature sensor 132.

Temperature compensation block 1720 includes the models for heating and cooling similar to block 1408 depicted in FIG. 14. In particular, the processing circuitry 104 may determine whether the electronic circuit board 150 is expected to be heating or cooling (1722). If heating, then E=1 (YES branch of 1722) and the processing circuitry 104 determines the temperature compensation according to the heating steps of the algorithm (1724). For example, the processing circuitry 104 may determine whether the electronic circuit board 150 is at steady state, determine the heating dynamic factor, $\Delta T$, and compensate the temperature measured by temperature sensor 132 to calculate the ambient temperature, Tambient, of the room in which the thermostat is placed.

If cooling (NO branch of 1722), the processing circuitry 104 determines the temperature compensation according to the cooling steps of the algorithm (1726). For example, the processing circuitry 104 may determine whether the temperature of electronic circuit board 150 has reached an equilibrium level, determine the cooling dynamic factor, $\delta T$, and compensate the temperature measured by the cool sensor to calculate the ambient temperature, Tambient, (1728) as described above in relation to blocks 1424 and 1426 of FIG. 14. The processing circuitry 104 then continues the next cycle of the algorithm by executing the inputs block 1706.

FIG. 17B is a flowchart illustrating additional details for the initial conditions block of the ambient temperature estimation algorithm for the thermostat device of this disclosure. The example of flowchart 1730A is an example of the initial conditions block 1730 described above in relation to FIG. 17A. The "A" and "B" in FIG. 17B correspond to the "A" and "B" depicted in FIG. 17A.

As described in FIG. 17A, the processing circuitry 104 may perform the techniques of initial conditions block 1730 in response to a change in operating mode of the thermostat device 102. The operating mode may change in a thermostat, such as thermostat device 102 described above in relation to FIG. 1, based on user input to the thermostat, or in some examples, based on a preprogrammed schedule. When the operating mode changes, the algorithm described above in relation to FIG. 17A, may set various initial conditions based on the current operating mode compared to the new operating mode as well as whether the current operating mode is in steady state, e.g. reached the equilibrium point for that operating mode.

In flowchart 1730A, processing circuitry 104 may determine whether the change in operating mode results in the electronic circuit board 150 cooling (E=2) or heating (E=1) (1732). Processing circuitry 104 may determine whether the electronic circuit board 150 will be heated or cooled in response to the change in operating mode of the thermostat device 102 based at least in part on the operating mode prior to the change in operating mode and the operating mode after the change in operating mode. For example, as described above with respect to FIGS. 15 and 16, the electronic circuit board 150 may generally heat up when the operating mode of the thermostat device 102 changes from OM1 to OM2, from OM1 to OM3, and from OM2 to OM3. However, in some circumstances, the electronic circuit board 150 may cool when the operating mode of the thermostat device 102 changes from OM1 to OM2.

Similarly, as described above with respect to FIGS. 15 and 16, the electronic circuit board 150 may generally cool down when the operating mode of the thermostat device 102 changes from OM3 to OM1, from OM2 to OM1, and from OM3 to OM2. However, in some circumstances, the electronic circuit board 150 may heat up when the operating mode of thermostat device 102 changes from OM2 to OM1, from OM3 to OM1, and from OM3 to OM2. As such, determining whether the operating mode changes to a higher operating mode or to a lower operating mode may not be definitive as to whether the electronic circuit board 150 will be heated or cooled in response to a change in the operating mode of the thermostat device 102.

Thus, in addition to comparing the operating mode prior to the change in operating mode with the operating mode after the change in operating mode, processing circuitry 104 may determine the difference $\Delta T$ between the temperature Tsensor measured by temperature sensor 132 and the most-recently determined ambient temperature Tambient and compare $\Delta T$ and the steady state temperature difference $\Delta T_{SS}$ for the current operating mode (the operating mode after the change in operating mode. If $\Delta T$ is higher than $\Delta T_{SS}$, then processing circuitry 104 may determine that the electronic circuit board 150 is cooling (E=2). On the other hand, if $\Delta T$ is lower than $\Delta T_{SS}$, then processing circuitry 104 may determine that the electronic circuit board 150 is heating (E=1).

Some examples of initial conditions may include which characteristic curve to follow and at which part of the characteristic curve (e.g. based on the elapsed time as measured by the counter) to compute of the dynamic factor. Thus, in response to determining that the electronic circuit board 150 is heating, processing circuitry 104 may determine initial conditions for the heating curve of the current operating mode (1734). For example, the processing circuitry 104 may calculate the counter value i that corresponds to the current point of the heating curve of the current operating mode. Processing circuitry 104 may determine the difference $\Delta T$ between the temperature Tsensor measured by temperature sensor 132 and the most-recently determined ambient temperature Tambient and may determine the counter value i that corresponds to the current point of the heating curve for the current operating mode based at least in part on $\Delta T$.

Similarly, in response to determining that the electronic circuit board 150 is cooling, processing circuitry 104 may determine initial conditions for the cooling curve of the current operating mode (1736). For example, the processing circuitry 104 may calculate the counter value i that corresponds to the current point of the cooling curve of the current operating mode. Processing circuitry 104 may determine the difference $\Delta T$ between the temperature Tsensor measured by temperature sensor 132 and the most-recently determined ambient temperature Tambient. Processing circuitry 104 may determine the cooling dynamic factor $\delta T$ as the difference between $\Delta T$ and the steady state temperature difference $\Delta T_{SS}$. Processing circuitry 104 may therefore determine the counter value i that corresponds to the current point of the cooling curve for the current operating mode based at least in part on T. Upon determining the counter value i that corresponds to the current point of the cooling curve or heating curve for the current operating mode, processing circuitry 104 may return to block 1706 of FIG. 17A.

FIG. 17C is a flowchart illustrating additional details for the initial conditions block of the ambient temperature estimation algorithm for the thermostat device of this disclosure. The example of flowchart 1713A is an example of the initial conditions block 1713 described above in relation to FIG. 17A. The "C" and "B" in FIG. 17C correspond to the "C" and "B" depicted in FIG. 17A.

As described in FIG. 17A, the processing circuitry 104 may perform the techniques of initial conditions block 1713 in response to a change in the base of the thermostat device 102. The operating mode may change in a thermostat, such as thermostat device 102 described above in relation to FIG. 1. For example, thermostat device 102 may have three styles of bases: a first style of base where thermostat device 102 is battery-powered, a second style of base where thermostat device 102 is line powered (e.g., via A/C power), and a third style of base where the backlight of the display (e.g., user interface 103) of the thermostat device 102 is on.

In flowchart 1713A, processing circuitry 104 may determine whether the change in the base results in the electronic circuit board 150 cooling (E=2) or heating (E=1) (1732). Processing circuitry 104 may determine whether the electronic circuit board 150 will be heated or cooled in response to the change in base of the thermostat device 102 based at least in part on the base prior to the change in the base and the base after the change in base. For example, the electronic circuit board 150 may generally heat up when going from the first base where thermostat device 102 is battery-powered to the second base where thermostat device 102 is line powered or the third base where the backlight of the display of thermostat device 102 is on. Further, the electronic circuit board 150 may generally heat up when going from the second base to the third base. Similarly, the electronic circuit board 150 may generally cool down when going from the third base to the second base or the first base, or when going from the second base to the first base.

Some examples of initial conditions may include which characteristic curve to follow and at which part of the characteristic curve (e.g. based on the elapsed time as measured by the counter) to compute of the dynamic factor. Thus, in response to determining that the electronic circuit board 150 is heating, processing circuitry 104 may determine initial conditions for the heating curve of the current operating mode for the current base (1744). For example, the processing circuitry 104 may calculate the counter value i that corresponds to the current point of the heating curve of the current operating mode for the current base. Processing circuitry 104 may determine the difference $\Delta T$ between the temperature Tsensor measured by temperature sensor 132 and the most-recently determined ambient temperature Tambient and may determine the counter value i that corresponds to the current point of the heating curve for the current operating mode for the current base based at least in part on $\Delta T$.

Similarly, in response to determining that the electronic circuit board 150 is cooling, processing circuitry 104 may determine initial conditions for the cooling curve of the current operating mode for the current base (1746). For example, the processing circuitry 104 may calculate the counter value i that corresponds to the current point of the cooling curve of the current operating mode for the current base. Processing circuitry 104 may determine the difference $\Delta T$ between the temperature Tsensor measured by temperature sensor 132 and the most-recently determined ambient temperature Tambient. Processing circuitry 104 may determine the cooling dynamic factor $\delta T$ as the difference between $\Delta T$ and the steady state temperature difference $\Delta T_{SS}$. Processing circuitry 104 may therefore determine the counter value i that corresponds to the current point of the cooling curve for the current operating mode for the current base based at least in part on $\delta T$. Upon determining the counter value i that corresponds to the current point of the cooling curve or heating curve for the current operating mode for the current base, processing circuitry 104 may return to block 1706 of FIG. 17A.

Besides the counter, operating mode, and base, the current and the voltage may be inputs for determining heating dynamic factor $\Delta T$ and cooling dynamic factor $\delta T$. In particular, the operating voltage of thermostat device 102 and the amount of current running through relays 106-110 of thermostat device 102 may be inputs into temperature compensation model 120 for determining the ambient temperature.

In some aspects of the present disclosure, the thermostat device may estimate the amount of current flowing through relays 106-110 and the operating voltage of thermostat device 102 using the temperatures sensed by two temperature sensors in the thermostat device—temperature sensor 130 and temperature sensor 132. As described in FIG. 1, the thermostat device may include two temperature sensors, a cool temperature sensor (e.g., temperature sensor 132 of FIG. 1) and a hot temperature sensor (temperature sensor 130 of FIG. 1), where the cool temperature sensor is located at a relatively cooler area of the electronic circuit board 150 while the hot sensor is placed at a relatively hotter area of the electronic circuit board 150. The cool sensor is used to determine the ambient temperature while the hot sensor is used to estimate the current and voltage.

Figure 18:
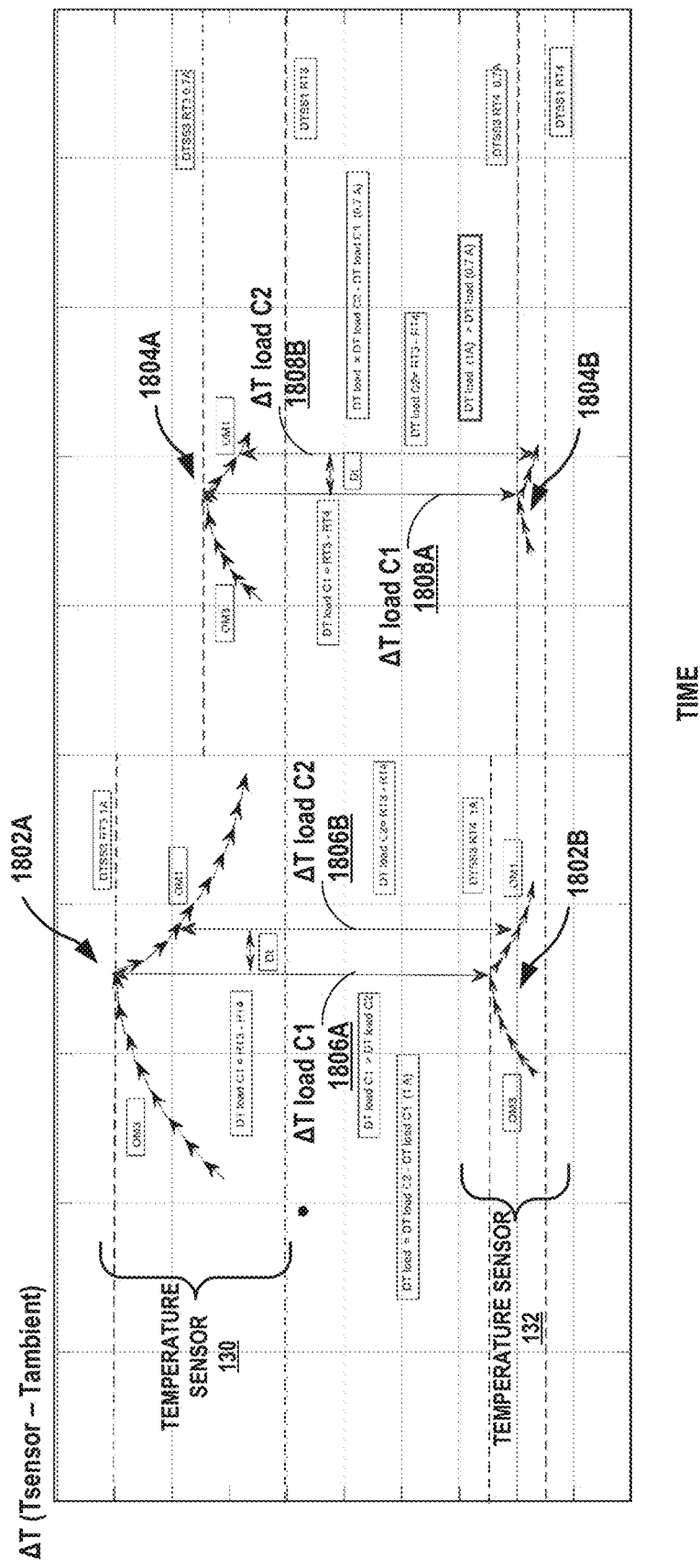
FIG. 18 is a time graph illustrating techniques for determining the amount of current flowing through one or more relays of a thermostat device via use of two temperature sensors according to one or more aspects of the present disclosure.

FIG. 18 is a time graph illustrating techniques for determining the amount of current flowing through one or more relays of a thermostat device via use of two temperature sensors according to one or more aspects of the present disclosure. As shown in FIG. 18, temperature curve 1802A is the temperature curve followed by temperature measured by the hot temperature sensor 130 with a current of 1 amp flowing through relays 106-110, where the operating mode of thermostat device 102 switches from operating mode 3 (OM3) to operating mode 1 (OM1). Temperature curve 1802B below temperature curve 1802A is the temperature curve followed by temperature measured by the cold temperature sensor 132 with the same current of 1 amp flowing through relays 106-110, where the operating mode of thermostat device 102 also switches from OM3 to OM1.

$\Delta T$ load C1 1806A is the difference between temperature curve 1802A and temperature curve 1802B at the point where the thermostat device 102 switches from OM3 to OM1. $\Delta T$ load C2 1806B is the difference between temperature curve 1802A and temperature curve 1802B at some point after the thermostat device 102 switches from OM3 to OM1. $\Delta T$ load for 1 amp of current can be computed as the value of $\Delta T$ load C2 1806B minus the value of $\Delta T$ load C1 1806A. The values of $\Delta T$ load relates to the amount of current through the relays 106-110.

Similarly, temperature curve 1804A is the temperature measured by the hot temperature sensor 130 with a current of 0.7 amp flowing through relays 106-110 where the operating mode switches from operating mode 3 (OM3) to operating mode 1 (OM1). Temperature curve 1804B below temperature curve 1804A is the temperature measured by the cold temperature sensor 132 with the same current of 0.7 amp flowing through relays 106-110 where the operating mode also switches from OM3 to OM1.

$\Delta T$ load C1 1808A is the difference between temperature curve 1804A and temperature curve 1804B at the point where the thermostat device 102 switches from OM3 to OM1. $\Delta T$ load C2 1808B is the difference between temperature curve 1804A and temperature curve 1804B at some point after the thermostat device 102 switches from OM3 to OM1. $\Delta T$ load for 0.7 amp of current can be computed as the value of $\Delta T$ load C2 1808B minus the value of $\Delta T$ load C1 1808A. The values of $\Delta T$ load relates to the amount of current through the relays 106-110.

The determined $\Delta T$ load for 1 amp flowing through relays 106-110 can be compared with the determined $\Delta T$ load for 0.7 amp flowing through relays 106-110. In particular, the $\Delta T$ load for 1 amp is larger than the $\Delta T$ load for 0.7 amp. As such, the calculated $\Delta T$ loads are indicative of the amount of current through the relays 106-110. In particular, the higher the level current running through the relays 106-110, the larger the value of $\Delta T$ load for the current.

Figure 19:
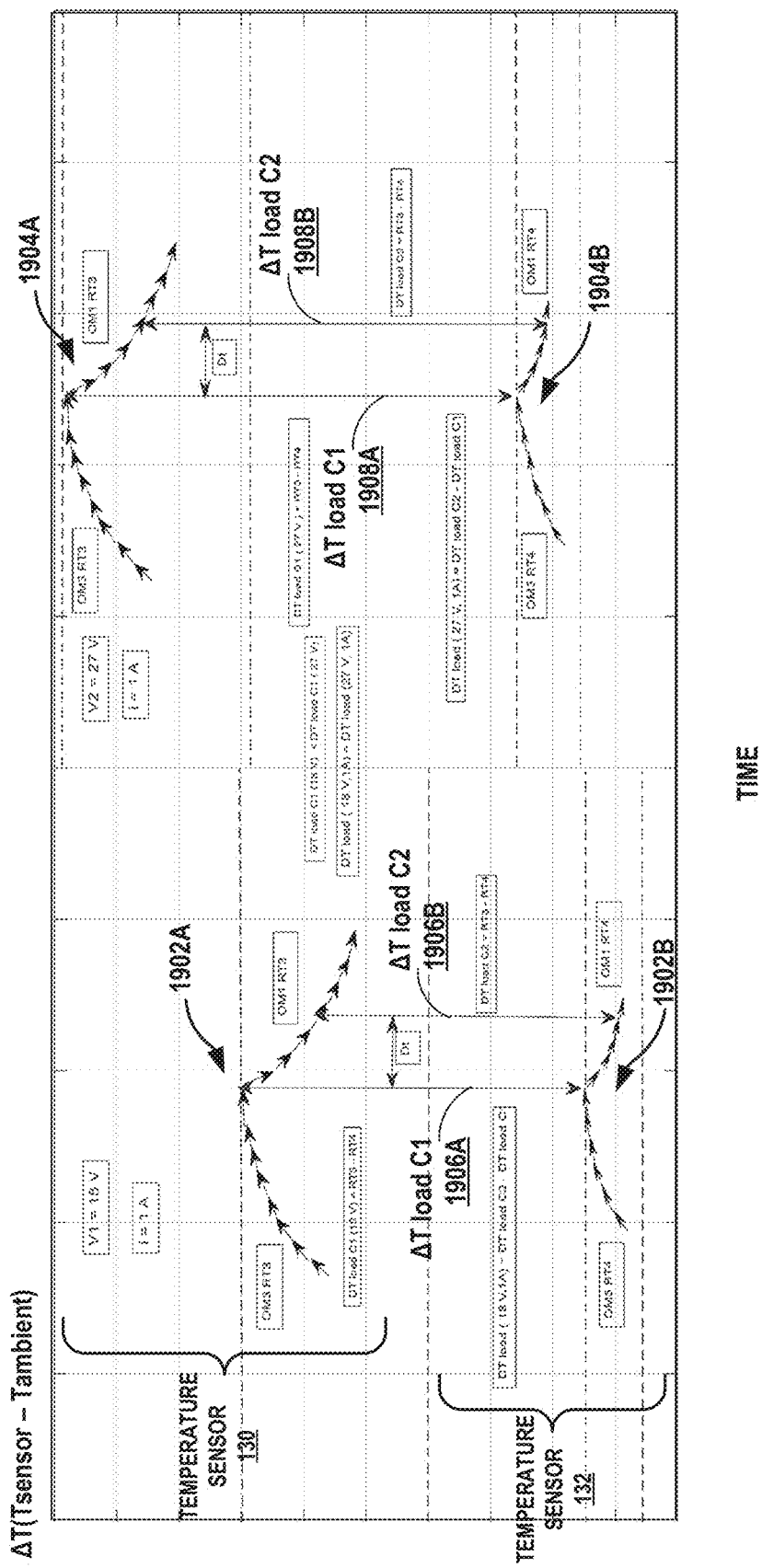
FIG. 19 is a time graph illustrating techniques for determining the operating voltage of a thermostat device via use of two temperature sensors according to one or more aspects of the present disclosure.

FIG. 19 is a time graph illustrating techniques for determining the operating voltage of a thermostat device via use of two temperature sensors according to one or more aspects of the present disclosure. As shown in FIG. 19, temperature curve 1902A is the temperature measured by the hot temperature sensor 130 where thermostat device 102 has an operating voltage of 18 volts and where the operating mode switches from operating mode 3 (OM3) to operating mode 1 (OM1). Temperature curve 1902B below temperature curve 1902A is the temperature measured by the cold temperature sensor 132 where thermostat device 102 has the same operating voltage of 18 volts where the operating mode also switches from OM3 to OM1.

ΔT load C1 1906A is the difference between temperature curve 1902A and temperature curve 1902B at the point where the thermostat device 102 switches from OM3 to OM1. ΔT load C2 1906B is the difference between temperature curve 1902A and temperature curve 1902B at some point after the thermostat device 102 switches from OM3 to OM1.

Similarly, temperature curve 1904A is the temperature measured by the hot temperature sensor 130 of a thermostat device with an operating voltage of 27 volts where the operating mode switches from operating mode 3 (OM3) to operating mode 1 (OM1). Temperature curve 1904B below temperature curve 1904A is the temperature measured by the cold temperature sensor 132 of thermostat device 102 having the same operating voltage of 27 volts where the operating mode also switches from OM3 to OM1.

ΔT load C1 1908A is the difference between temperature curve 1904A and temperature curve 1904B at the point where the thermostat device 102 switches from OM3 to OM1. ΔT load C2 1908B is the difference between temperature curve 1904A and temperature curve 1904B at some point after the thermostat device 102 switches from OM3 to OM1.

In some examples, the amount of operating voltage of thermostat device 102 may relate to the difference between the temperatures sensed by temperature sensors 130 and 132, such as ΔT load C1 1906A and ΔT load C1 1908A. In these examples, it may not be necessary to determine ΔT load (e.g., the difference between ΔT load C1 1906A and ΔT load C2 1906B) in order to determine a relationship between the amount of operating voltage of thermostat device 102 from the difference between the temperatures sensed by temperature sensors 130 and 132.

Data such as illustrated in FIGS. 18 and 19 may be used to construct a neural network model for current and voltage recognition, such as load recognition model 122. For example, data such as ΔT load may be determined from thermostat devices running at different operating modes with different amounts of current flowing through relays of the thermostat devices and at different operating voltages, similar to the techniques illustrated in FIGS. 18 and 19 and may be used as inputs in order to construct the neural network model.

Figure 20:
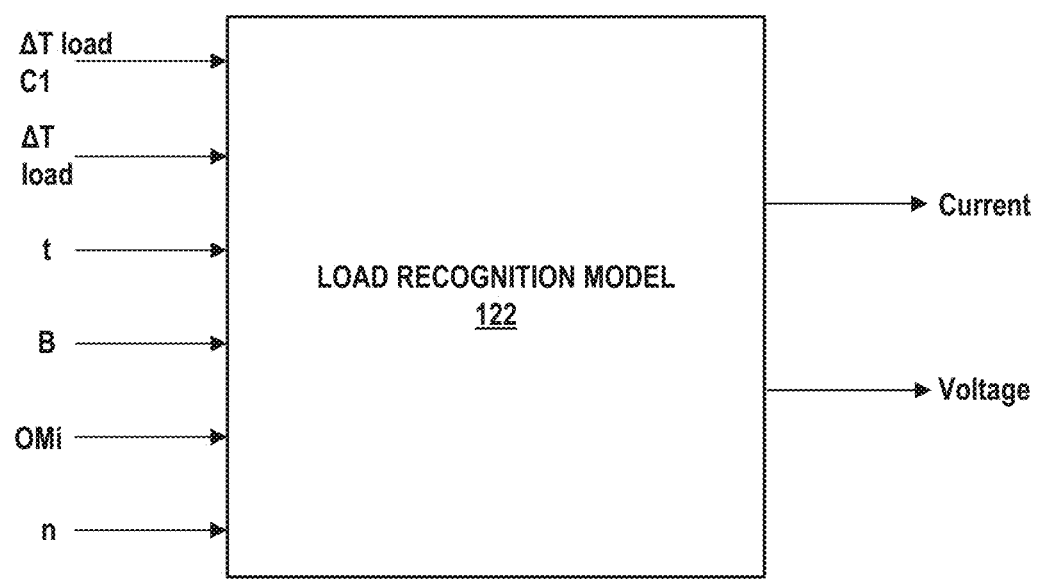
FIG. 20 illustrates an example of the load recognition model of a thermostat device according to one or more aspects of the present disclosure.

FIG. 20 illustrates an example of the load recognition model of a thermostat device according to one or more aspects of the present disclosure. As shown in FIG. 20, load recognition model 122 of thermostat device 102 may take, as inputs ΔT load C1 and ΔT load determined from temperatures sensed by temperature sensors 130 and 132, such as in the examples of FIGS. 18 and 19, the time (e.g., counter value), base, the initial operating mode (OMi), and n, which may be the amount of time between determining ΔT load C1 and ΔT load C2 for the purposes of calculating ΔT load. Load recognition model 122 may take the inputs and determine the amount of current flowing through relays 106-110 and the operating voltage of thermostat device 102.

Example training data for training thermostat device 102 may be as follows:

| ΔT load C1 | ΔT load | Time (Counter) | Base | OMi | n | Current | Voltage |
|---|---|---|---|---|---|---|---|
| 4.027 | −0.211 | 300 | 2 | 2 | 9 | 1 | 18 |
| 4.027 | −0.258 | 300 | 2 | 2 | 12 | 1 | 18 |
| 4.027 | −0.305 | 300 | 2 | 2 | 15 | 1 | 18 |
| ... | ... | ... | ... | ... | ... | ... | ... |
| 4.027 | −0.235 | 1000 | 2 | 2 | 9 | 1 | 18 |
| 4.027 | −0.328 | 1000 | 2 | 2 | 12 | 1 | 18 |
| ... | ... | ... | ... | ... | ... | ... | ... |
| ... | ... | ... | ... | ... | ... | ... | ... |
| 25.59 | −0.273 | 800 | 3 | 3 | 9 | 0.7 | 24 |
| 25.59 | −0.281 | 800 | 3 | 3 | 12 | 0.7 | 24 |
| 25.59 | −0.367 | 800 | 3 | 3 | 15 | 0.7 | 24 |
| 25.59 | −0.367 | 800 | 3 | 3 | 18 | 0.7 | 24 |
| 25.59 | −0.382 | 800 | 3 | 3 | 21 | 0.7 | 24 |
| 25.59 | −0.429 | 800 | 3 | 3 | 24 | 0.7 | 24 |

The training data, such as in the example above, may be fed into a neural network, such as a convolutional neural network or any other suitable machine learning algorithm in order to perform deep learning to construct load recognition model 122.

Figure 21:
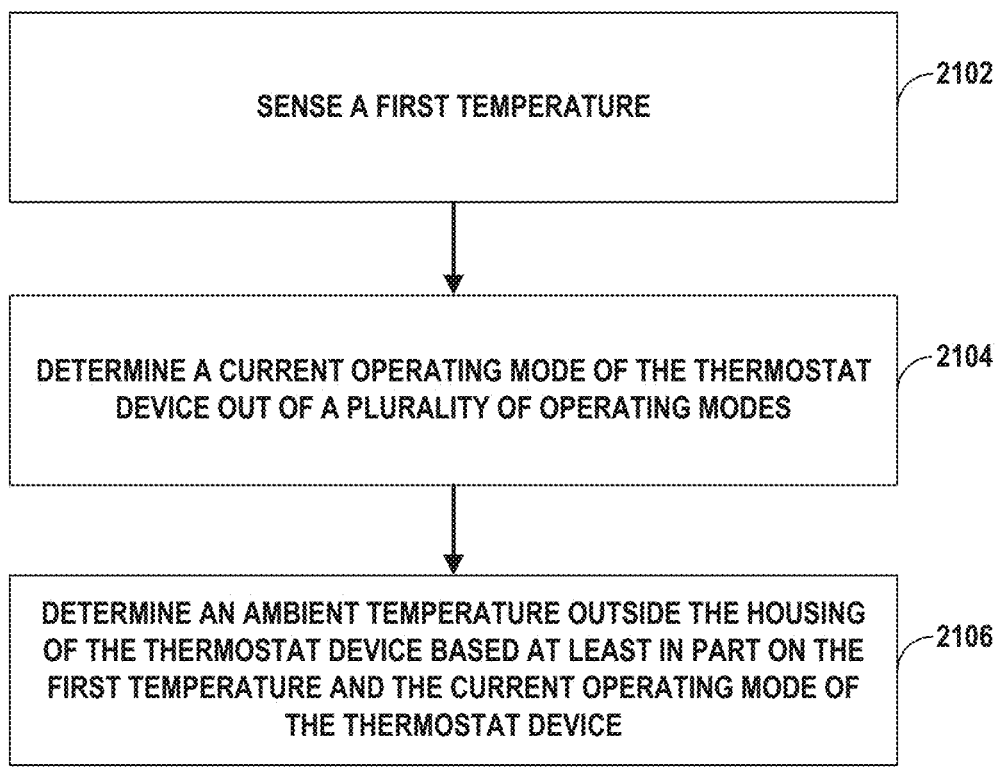
FIG. 21 is a flowchart illustrating example operations of a thermostat device to perform temperature compensation according to one or more aspects of the present disclosure.

FIG. 21 is a flowchart illustrating example operations of a thermostat device to perform temperature compensation according to one or more aspects of the present disclosure. The techniques are illustrated with respect to thermostat device 102 of FIG. 1.

As shown in FIG. 21, a first temperature sensor 132 disposed on an electronic circuit board 150 in a housing 160 of a thermostat device 102 may sense a first temperature (2102).

The processing circuitry 104 of the thermostat device 102 may determine a current operating mode of the thermostat device 102 out of a plurality of operating modes (2104).

The processing circuitry 104 may determine an ambient temperature outside the housing 160 of the thermostat device 102 based at least in part on the first temperature and the current operating mode of the thermostat device 102 (2106). In some examples, the processing circuitry may determine an operating voltage of the thermostat device 102, determine an amount of current flowing through one or more relays 106-110 of the thermostat device 102, and determine the ambient temperature outside the housing 160 of the thermostat device 102 based at least in part on the first temperature, the operating voltage, the amount of current flowing through the one or more relays 106-110, and the current operating mode of the thermostat device 102.

In some examples, to determine the operating voltage of the thermostat device 102 and to determine the amount of current flowing through the one or more relays 110, a second temperature sensor 130 disposed on the electronic circuit board 150 in the housing 160 may sense a second temperature. The processing circuitry 104 may estimate, based at least in part on the first temperature and the second temperature, the operating voltage of the thermostat device 102 and the amount of current flowing through the one or more relays 106-110.

In some examples, the processing circuitry 104 may determine a style of base of the thermostat device 102 out of a plurality of bases. The processing circuitry 104 may determine the ambient temperature outside the housing 160 of the thermostat device 102 based at least in part on the first temperature, the operating voltage of the thermostat device 102, the amount of current flowing through the one or more relays 106-110, the base, and the current operating mode of the thermostat device 102.

In some examples, the processing circuitry 104 may determine that the thermostat device 102 has had an operating mode change from a previous operating mode to the current operating mode. The processing circuitry 104 may determine whether the electronic circuit board 150 is heating up or cooling down in response to the operating mode change. The processing circuitry 104 may, in response to determining that the electronic circuit board 150 is heating up, determine a heating curve associated with the current operating mode for determining the ambient temperature.

In some examples, the processing circuitry 104 may, in response to determining that the electronic circuit board 150 is heating up, determine a heating dynamic factor $\Delta T$ for the first temperature sensed by the first temperature sensor 132 based at least on the heating curve. The processing circuitry 104 may determine the ambient temperature as the first temperature sensed by the first temperature sensor 132 minus the heating dynamic factor $\Delta T$.

In some examples, to determine the heating dynamic factor $\Delta T$ for the first temperature sensed by the first temperature sensor 132 based at least on the heating curve, the processing circuitry 104 may determine a point on the heating curve associated with the first temperature sensed by the first temperature sensor 132. The processing circuitry 104 may determine the heating dynamic factor $\Delta T$ that corresponds to the point on the heating curve.

In some examples, the processing circuitry 104 may determine that the thermostat device 102 has had an operating mode change from a previous operating mode to the current operating mode. The processing circuitry 104 may determine whether the electronic circuit board 150 is heating up or cooling down in response to the operating mode change. The processing circuitry 104 may, in response to determining that the electronic circuit board 150 is cooling down, determine a cooling curve associated with the current operating mode for determining the ambient temperature.

In some examples, the processing circuitry 104 may, in response to determining that the electronic circuit board 150 is cooling down, determine a cooling dynamic factor $\delta T$ for the first temperature sensed by the first temperature sensor 132 based at least in part on the cooling curve. The processing circuitry 104 may determine a steady state temperature difference $\Delta T_{SS}$ associated with the current operating mode of the thermostat device 102. The processing circuitry 104 may determine the ambient temperature as the first temperature sensed by the first temperature sensor 132 minus the cooling dynamic factor $\delta T$ minus the steady state temperature difference $\Delta T_{SS}$ associated with the current operating mode of the thermostat device 102.

In some examples, to determine the cooling dynamic factor $\delta T$ for the first temperature sensed by the first temperature sensor 132 based at least on the cooling curve, the processing circuitry 104 may determine a point on the cooling curve associated with the first temperature sensed by the first temperature sensor 132. The processing circuitry 104 may determine the cooling dynamic factor $\delta T$ that corresponds to the point on the cooling curve.

The disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

The invention claimed is:

1. A thermostat device comprising:
a housing;
an electronic circuit board in the housing;
a first temperature sensor disposed on the electronic circuit board in the housing and configured to sense a first temperature;
one or more relays; and
processing circuitry in the housing configured to:
determine a current operating mode of the thermostat device out of a plurality of operating modes;
determine an operating voltage of the thermostat device;
determine an amount of current flowing through the one or more relays; and
determine an ambient temperature outside the housing of the thermostat device based at least in part on the first temperature, the operating voltage, the amount of current flowing through the one or more relays, and the current operating mode of the thermostat device.

2. The thermostat device of claim 1, further comprising:
a second temperature sensor disposed on the electronic circuit board in the housing and configured to sense a second temperature;
wherein the processing circuitry is further configured to:
estimate, based at least in part on the first temperature and the second temperature, the operating voltage of the thermostat device and the amount of current flowing through the one or more relays.

3. The thermostat device of claim 1, wherein the processing circuitry is further configured to:
determine a style of base of the thermostat device out of a plurality of bases; and
determine the ambient temperature outside the housing of the thermostat device based at least in part on the first temperature, the operating voltage, the amount of current flowing through the one or more relays, the style of base, and the current operating mode of the thermostat device.

4. The thermostat device of claim 3, wherein the processing circuitry is further configured to:
determine that the thermostat device has had an operating mode change from a previous operating mode to the current operating mode;
determine whether the electronic circuit board is heating up or cooling down in response to the operating mode change; and
in response to determining that the electronic circuit board is heating up, determine a heating curve associated with the current operating mode for determining the ambient temperature.

5. The thermostat device of claim 4, wherein the processing circuitry is further configured to:
in response to determining that the electronic circuit board is heating up, determine a heating dynamic factor $\Delta T$ for the first temperature sensed by the first temperature sensor based at least on the heating curve; and
determine the ambient temperature as the first temperature sensed by the first temperature sensor minus the heating dynamic factor $\Delta T$.

6. The thermostat device of claim 5, wherein to determine the heating dynamic factor $\Delta T$ for the first temperature sensed by the first temperature sensor based at least on the heating curve, the processing circuitry is further configured to:
determine a point on the heating curve associated with the first temperature sensed by the first temperature sensor; and
determine the heating dynamic factor $\Delta T$ that corresponds to the point on the heating curve.

7. The thermostat device of claim 1, wherein the processing circuitry is further configured to:
determine that the thermostat device has had an operating mode change from a previous operating mode to the current operating mode;
determine whether the electronic circuit board is heating up or cooling down in response to the operating mode change; and
in response to determining that the electronic circuit board is cooling down, determine a cooling curve associated with the current operating mode for determining the ambient temperature.

8. The thermostat device of claim 7, wherein the processing circuitry configured to determine the ambient temperature is further configured to:
in response to determining that the electronic circuit board is cooling down, determine a cooling dynamic factor $\delta T$ for the first temperature sensed by the first temperature sensor based at least in part on the cooling curve;
determine a steady state temperature difference $\Delta TSS$ associated with the current operating mode of the thermostat device; and
determine the ambient temperature as the first temperature sensed by the first temperature sensor minus the cooling dynamic factor $\delta T$ minus the steady state temperature difference $\Delta TSS$ associated with the current operating mode of the thermostat device.

9. The thermostat device of claim 8, wherein the processing circuitry configured to determine the cooling dynamic factor $\delta T$ for the first temperature sensed by the first temperature sensor based at least on the cooling curve is further configured to:
determine a point on the cooling curve associated with the first temperature sensed by the first temperature sensor; and
determine the cooling dynamic factor $\delta T$ that corresponds to the point on the cooling curve.

10. A method for performing temperature compensation, comprising:
sensing, by a first temperature sensor disposed on an electronic circuit board in a housing of a thermostat device, a first temperature;
determining, by a processing circuitry of the thermostat device, a current operating mode of the thermostat device out of a plurality of operating modes;
determining, by the processing circuitry of the thermostat device, an operating voltage of the thermostat device;
determining, by the processing circuitry of the thermostat device, an amount of current flowing through one or more relays of the thermostat device; and
determining, by the processing circuitry, an ambient temperature outside the housing of the thermostat device based at least in part on the first temperature, the operating voltage, the amount of current flowing through the one or more relays, and the current operating mode of the thermostat device.

11. The method of claim 10, wherein determining the operating voltage of the thermostat device and determining the amount of current flowing through the one or more relays further comprises:
sensing, by a second temperature sensor disposed on the electronic circuit board in the housing, a second temperature; and
estimating, by the processing circuitry and based at least in part on the first temperature and the second temperature, the operating voltage of the thermostat device and the amount of current flowing through the one or more relays.

12. The method of claim 10, further comprising:
determining, by the processing circuitry, a style of base of the thermostat device out of a plurality of bases; and
determining, by the processing circuitry, the ambient temperature outside the housing of the thermostat device based at least in part on the first temperature, the operating voltage, the amount of current flowing through the one or more relays, the style of base, and the current operating mode of the thermostat device.

13. The method of claim 10, further comprising:
determining, by the processing circuitry, that the thermostat device has had an operating mode change from a previous operating mode to the current operating mode;
determining, by the processing circuitry, whether the electronic circuit board is heating up or cooling down in response to the operating mode change; and
in response to determining that the electronic circuit board is heating up, determining, by the processing circuitry, a heating curve associated with the current operating mode for determining the ambient temperature.

14. The method of claim 13, wherein determining the ambient temperature further comprises:
in response to determining that the electronic circuit board is heating up, determining, by the processing circuitry, a heating dynamic factor $\Delta T$ for the first temperature sensed by the first temperature sensor based at least on the heating curve; and
determining, by the processing circuitry, the ambient temperature as the first temperature sensed by the first temperature sensor minus the heating dynamic factor $\Delta T$.

15. The method of claim 14, wherein determining the heating dynamic factor $\Delta T$ for the first temperature sensed by the first temperature sensor based at least on the heating curve further comprises:
determining, by the processing circuitry, a point on the heating curve associated with the first temperature sensed by the first temperature sensor; and
determining, by the processing circuitry, the heating dynamic factor $\Delta T$ that corresponds to the point on the heating curve.

16. The method of claim 10, further comprising:
determining, by the processing circuitry, that the thermostat device has had an operating mode change from a previous operating mode to the current operating mode;
determining, by the processing circuitry, whether the electronic circuit board is heating up or cooling down in response to the operating mode change; and
in response to determining that the electronic circuit board is cooling down, determining, by the processing circuitry, a cooling curve associated with the current operating mode for determining the ambient temperature.

17. The method of claim 16, wherein determining the ambient temperature further comprises:
in response to determining that the electronic circuit board is cooling down, determining, by the processing circuitry, a cooling dynamic factor $\delta T$ for the first temperature sensed by the first temperature sensor based at least in part on the cooling curve;
determining, by the processing circuitry, a steady state temperature difference $\Delta TSS$ associated with the current operating mode of the thermostat device; and
determining, by the processing circuitry, the ambient temperature as the first temperature sensed by the first temperature sensor minus the cooling dynamic factor $\delta T$ minus the steady state temperature difference $\Delta TSS$ associated with the current operating mode of the thermostat device.

18. The method of claim 17, wherein determining the cooling dynamic factor $\delta T$ for the first temperature sensed by the first temperature sensor based at least on the cooling curve further comprises:
determining, by the processing circuitry, a point on the cooling curve associated with the first temperature sensed by the first temperature sensor; and
determining, by the processing circuitry, the cooling dynamic factor $\delta T$ that corresponds to the point on the cooling curve.

* * * * *